US012483828B2

(12) United States Patent
Tytgat et al.

(10) Patent No.: US 12,483,828 B2
(45) Date of Patent: Nov. 25, 2025

(54) AUDIO MEDIATION FOR MEETING SPACES

(71) Applicant: BARCO N.V., Kortrijk (BE)

(72) Inventors: Donny Tytgat, Kortrijk (BE); Erwin Six, Kortrijk (BE); Rajeev Shaik, Kortrijk (BE)

(73) Assignee: BARCO N.V., Kortrijk (BE)

( * ) Notice: Subject to any disclaimer, the term of this patent is extended or adjusted under 35 U.S.C. 154(b) by 237 days.

(21) Appl. No.: 18/324,246

(22) Filed: May 26, 2023

(65) Prior Publication Data

US 2024/0323600 A1 Sep. 26, 2024

Related U.S. Application Data

(60) Provisional application No. 63/492,167, filed on Mar. 24, 2023.

(51) Int. Cl.
*H04R 3/00* (2006.01)
*H04R 1/40* (2006.01)
*H04R 29/00* (2006.01)

(52) U.S. Cl.
CPC ............ *H04R 3/005* (2013.01); *H04R 1/406* (2013.01); *H04R 29/005* (2013.01)

(58) Field of Classification Search
CPC ....... H04R 3/005; H04R 1/406; H04R 29/005
USPC .................... 381/56, 58, 122, 124, 306, 365
See application file for complete search history.

(56) References Cited

U.S. PATENT DOCUMENTS

| | | | | |
|---|---|---|---|---|
| 9,986,360 | B1 * | 5/2018 | Aas | H04M 3/569 |
| 2018/0132038 | A1 * | 5/2018 | Dickins | H04R 3/02 |
| 2021/0195325 | A1 * | 6/2021 | Edry | H04M 3/002 |
| 2023/0224636 | A1 * | 7/2023 | Veselinovic | H04R 1/326 381/58 |
| 2023/0282224 | A1 * | 9/2023 | Chun | G10L 21/0232 381/56 |

* cited by examiner

*Primary Examiner* — William A Jerez Lora
(74) *Attorney, Agent, or Firm* — HSML P. C.

(57) ABSTRACT

Systems and methods for mediating an audio source during a meeting are provided. An active audio source is identified and mapped to instances connected to a communications and collaboration platform to determine a mapped instance. An audio signal device is determined from multiple devices for capturing audio from the active audio source. An audio system is configured to manipulate an active audio signal from the audio signal device via the mapped instance. In some cases, upon identifying a new active audio source, a new mapped instance is determined corresponding to the new active audio source.

15 Claims, 16 Drawing Sheets

100

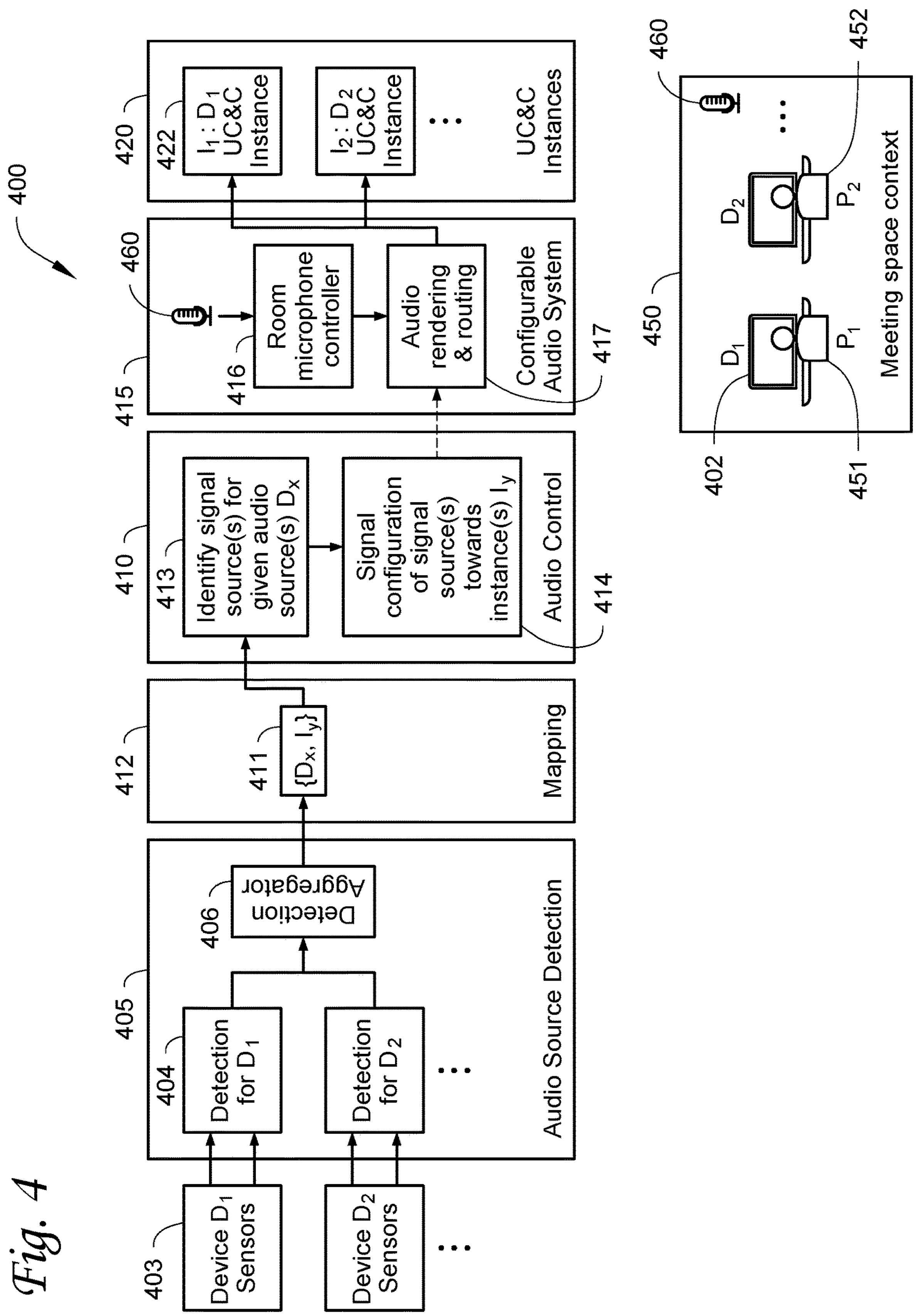
Fig. 4
400
403
Device D1 Sensors
Device D2 Sensors
405
404
Detection for D1
Detection for D2
406
Detection Aggregator
Audio Source Detection
412
411
{Dx, Iy}
Mapping
410
413
Identify signal source(s) for given audio source(s) Dx
Signal configuration of signal source(s) towards instance(s) Iy
414
Audio Control
415
460
416
Room microphone controller
Audio rendering & routing
417
Configurable Audio System
420
422
I1 : D1 UC&C Instance
I2 : D2 UC&C Instance
UC&C Instances
450
460
452
402
451
D1
D2
P1
P2
Meeting space context

AUDIO MEDIATION FOR MEETING SPACES

FIELD OF THE DISCLOSURE

The present disclosure is generally related to methods and systems for hybrid meeting spaces, more specifically the use of audio in situations where, in a certain meeting space, multiple devices may be connecting to a communications and collaboration platform.

BACKGROUND

Meeting spaces may be equipped with specific audio peripherals to facilitate hybrid meetings. Room microphones and speakers are for example used to capture and emit sound in the meeting space. By using such equipment, one can ensure a high-quality audio experience that is consistent and reliable for the meeting participants who are in the meeting space.

Currently, the audio signals that are input/output from these peripherals are typically connected to a single instance (login) of a Unified Communications & Collaboration (UC&C) tool. When sound is captured from a room microphone for instance, this signal will thus be sent to a single UC&C instance, regardless of the source of that sound.

SUMMARY

Features in the embodiments disclosed herein may provide systems and methods for mediating an audio source during a meeting on a communications and collaboration platform, for example, for a group of participants including multiple participants in a meeting room.

In one example embodiment, the present disclosure describes a system for mediating an audio source for a meeting on a communications and collaboration platform. The system includes an audio source detection module configured to identify at least one active audio source, an instance detection module configured to map the at least one active audio source to one or more instances connected to the communications and collaboration platform to determine a mapped instance, and an audio control module. The audio control module is configured to determine at least one audio signal device from a plurality of devices to capture audio from the active audio source, and configure an audio system to manipulate an active audio signal from the audio signal device via the mapped instance. In some cases, upon identifying a second active audio source, determining a second mapped instance corresponding to the second active audio source.

In another example embodiment, the present disclosure describes method for mediating an audio source for a meeting on a communications and collaboration platform. The method includes identifying at least one active audio source, mapping the active audio source to one or more instances connected to the communications and collaboration platform to determine a mapped instance, determining at least one audio signal device from a plurality of devices for the active audio source, configuring an audio system to manipulate an active audio signal from the audio signal device via the mapped instance, and in some cases, upon identifying a second active audio source, determining a second mapped instance corresponding to the second active audio source.

In another example embodiment, the present disclosure describes a system for mediating an audio source for a meeting on a communications and collaboration platform. The system includes an audio source detection module configured to identify at least one active audio source, an instance detection module configured to map the at least one active audio source to one or more instances connected to the communications and collaboration platform to determine a mapped instance, and an audio control module configured to determine at least one audio signal source from a plurality of devices for the active audio source, and configure an audio system to manipulate an active audio signal from the audio signal source via the mapped instance.

In another example embodiment, the present disclosure describes a method for mediating an audio source for a meeting on a communications and collaboration platform. The method includes identifying at least one active audio source, mapping the active audio source to one or more instances connected to the communications and collaboration platform to determine a mapped instance, determining at least one audio signal source from a plurality of devices for the active audio source, and configuring an audio system to manipulate an active audio signal from the audio signal source via the mapped instance.

In another example embodiment, the present disclosure describes a system for mediating an audio source for a meeting on a communications and collaboration platform. The system includes an audio source detection module configured to identify at least one active audio source, an instance detection module configured to map the at least one active audio source to one or more instances connected to the communications and collaboration platform to determine a mapped instance, and an audio control module. The audio control module is configured to determine at least one audio signal device from a plurality of devices to capture audio from the active audio source, and configure an audio system to manipulate an active audio signal from the audio signal device via the mapped instance. The system further includes one or more user devices and one or more peripheral devices coupled to the user devices.

In another example embodiment, the present disclosure describes an electronic meeting tool for mediating an audio source for a meeting on a communications and collaboration platform. The tool includes one or more peripheral devices adapted to couple one or more user devices to the communications and collaboration platform. The peripheral devices are further configured to: receive sensing data from an audio device, manipulate the sensing data, and sending the sensing data to a base unit to determine the audio source.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

The present disclosure provides a detailed and specific description that refers to the accompanying drawings. The drawings and specific descriptions of the drawings, as well as any specific or alternative embodiments discussed, are intended to be read in conjunction with the entirety of this disclosure. The system and methods may be embodied in many different forms and should not be construed as being limited to the embodiments set forth herein; rather, these embodiments are provided by way of illustration only and so that this disclosure will be thorough, complete and fully convey understanding to those skilled in the art.

References are made to the accompanying drawings that form a part of this disclosure and which illustrate embodiments in which the systems and methods described in this specification may be practiced.

Figure 1:
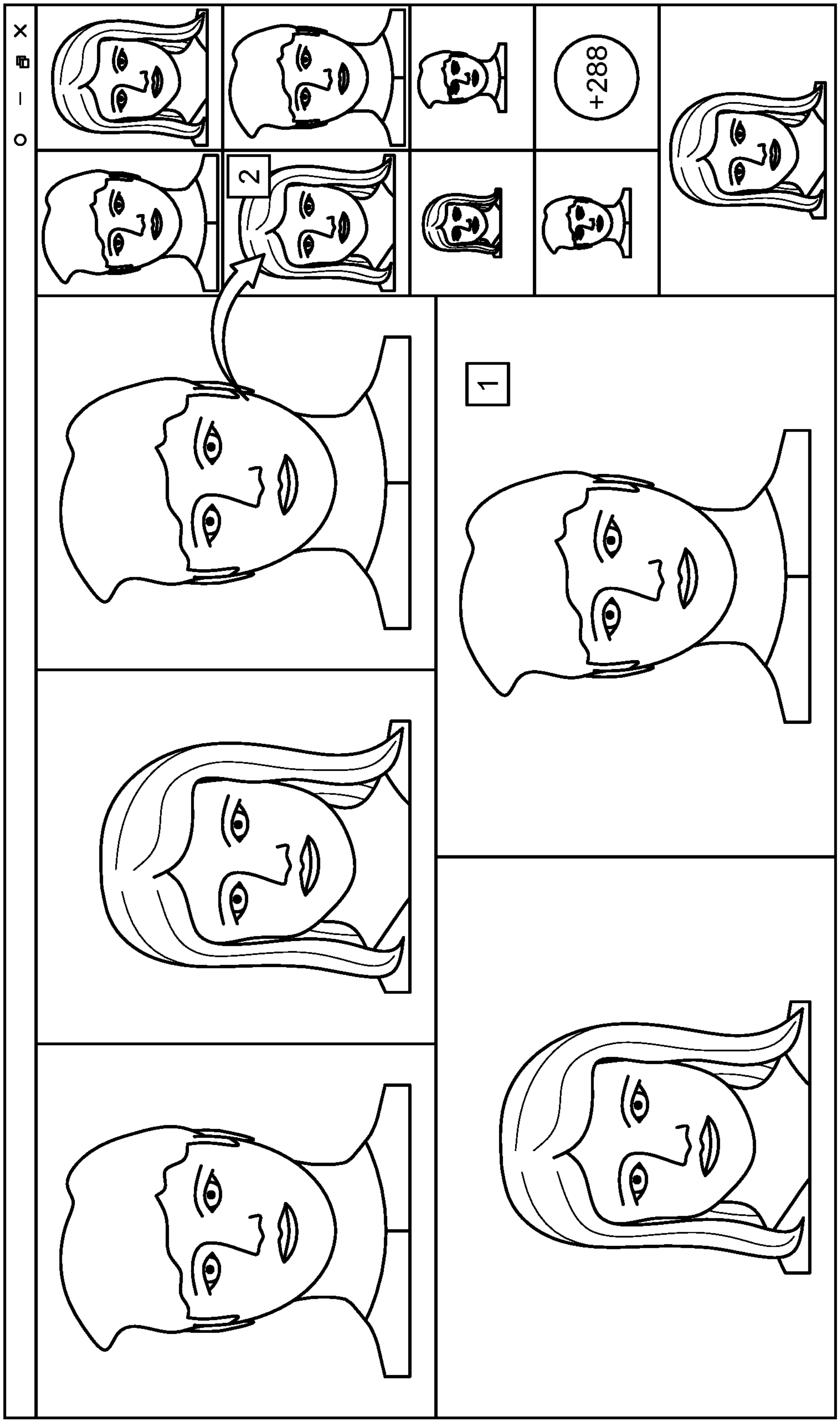

FIG. 1 is illustrative of a prior solution for connecting devices during a meeting in which the speaker is not prioritized.

Figure 2B:
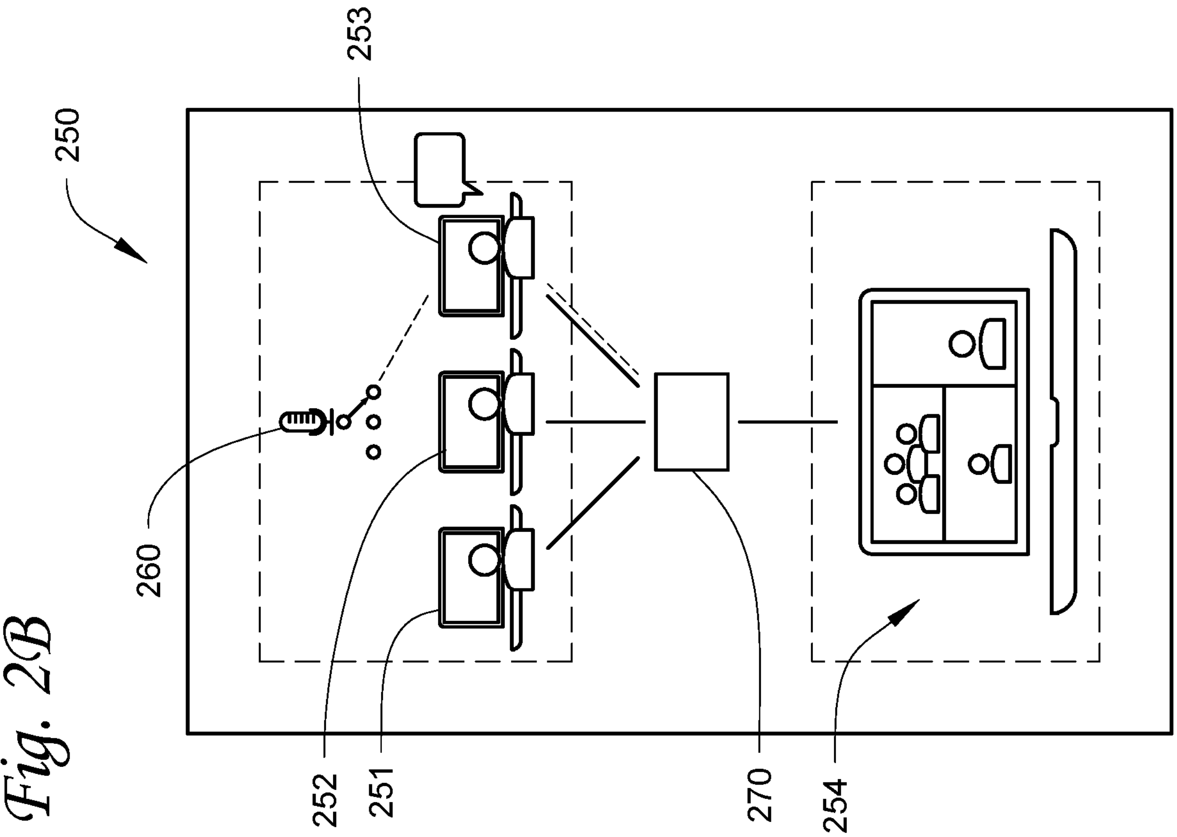
Figure 2A:
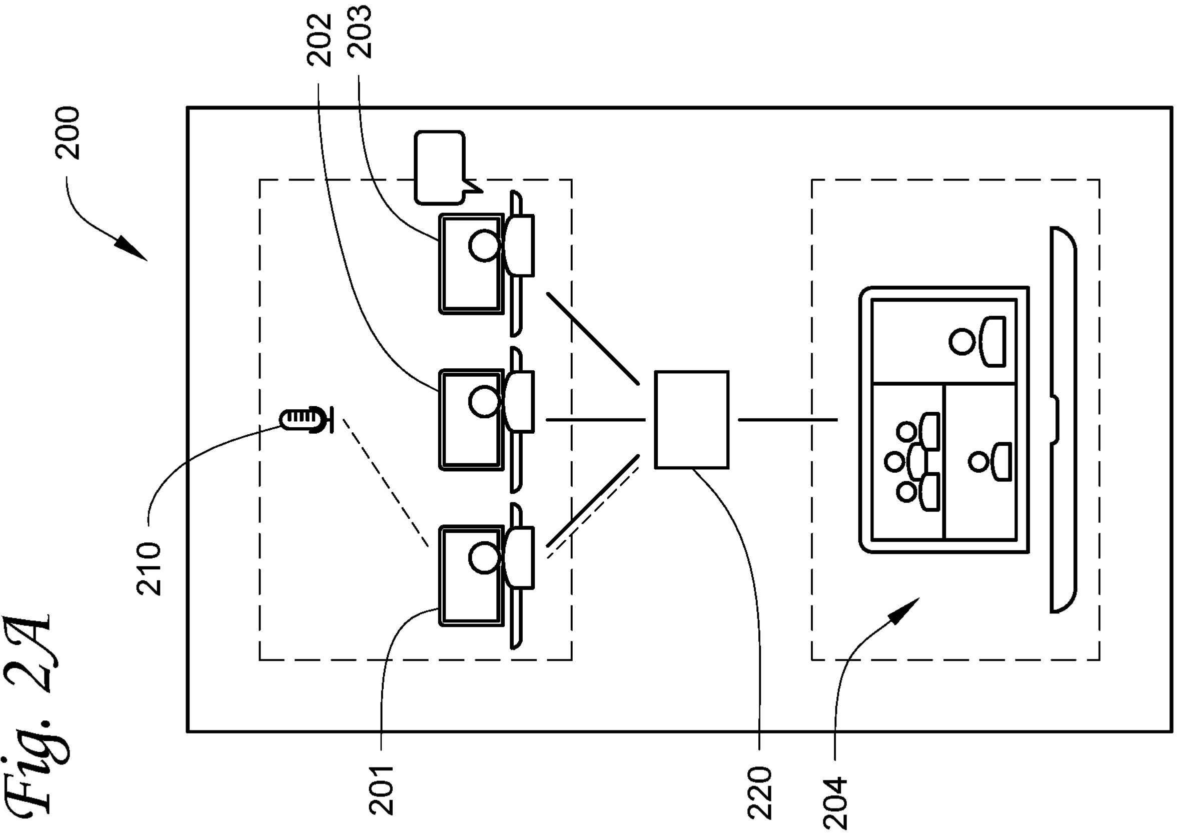

FIG. 2A is an illustrative diagram of an example meeting having a comparative system.

FIG. 2B is an illustrative diagram of an example meeting having the system according to at least one example embodiment described herein.

Figure 3:
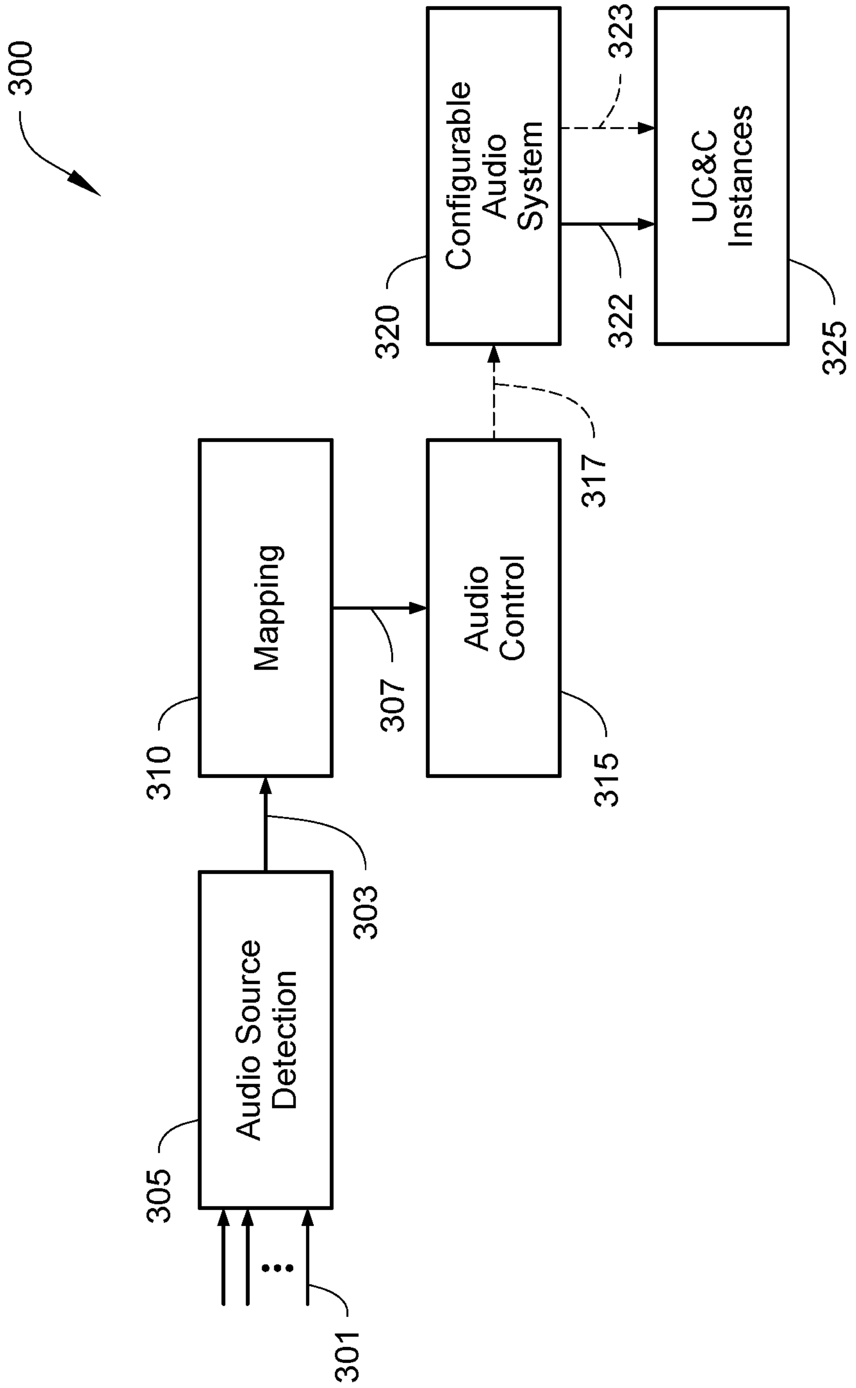

FIG. 3 illustrates an example block diagram of a system for mediating an audio source for a hybrid meeting on a communications and collaboration platform, according to at least one example embodiment described herein.

FIG. 4 shows a functional diagram of an embodiment of the system, according to at least one other example embodiment described herein.

Figure 5:
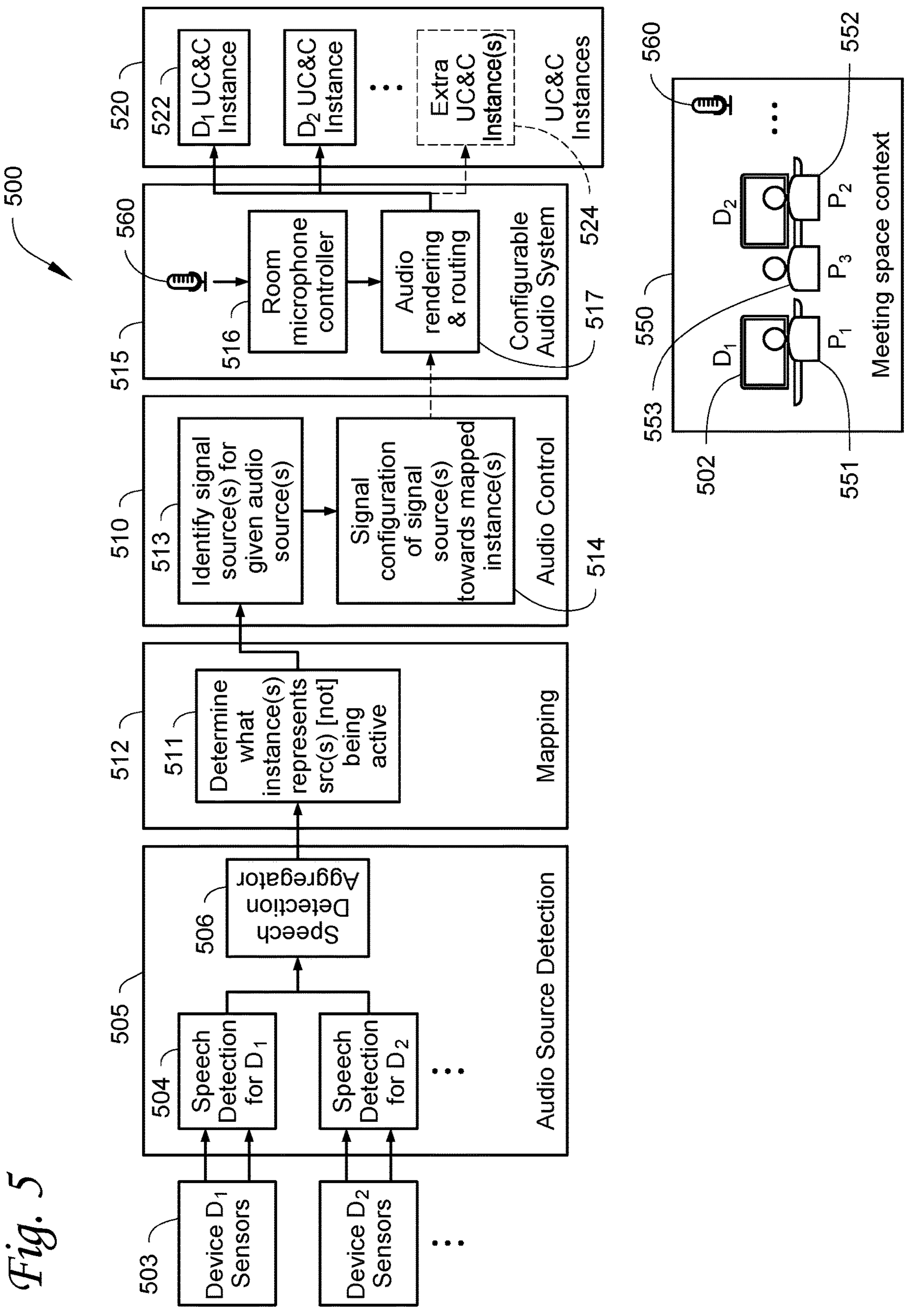

FIG. 5 shows a functional diagram of another embodiment of the system, according to at least another example embodiment described herein.

Figure 6:
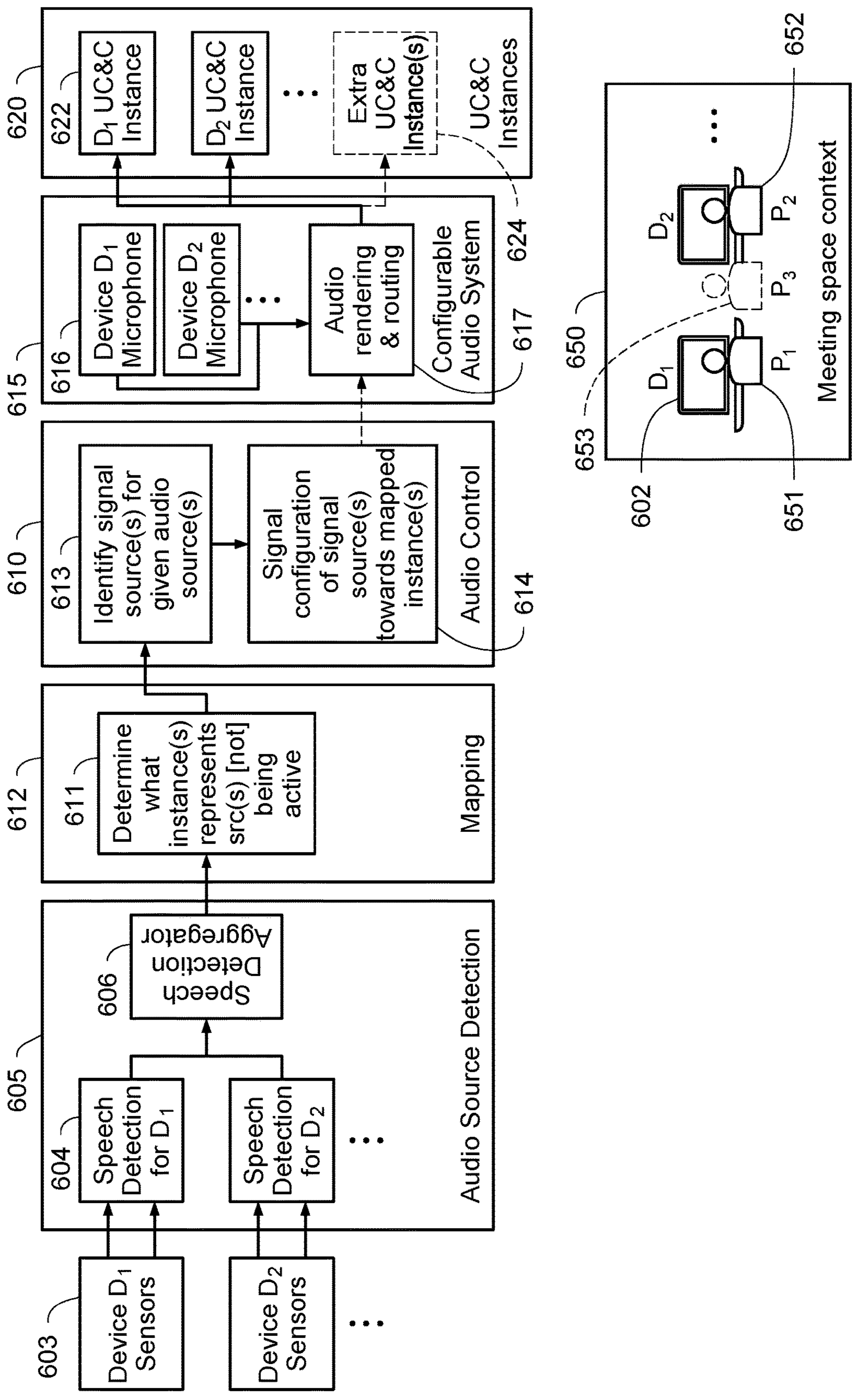

FIG. 6 illustrates a functional diagram of a meeting space that is used without an active room microphone, according to at least another example embodiment described herein.

Figure 7:
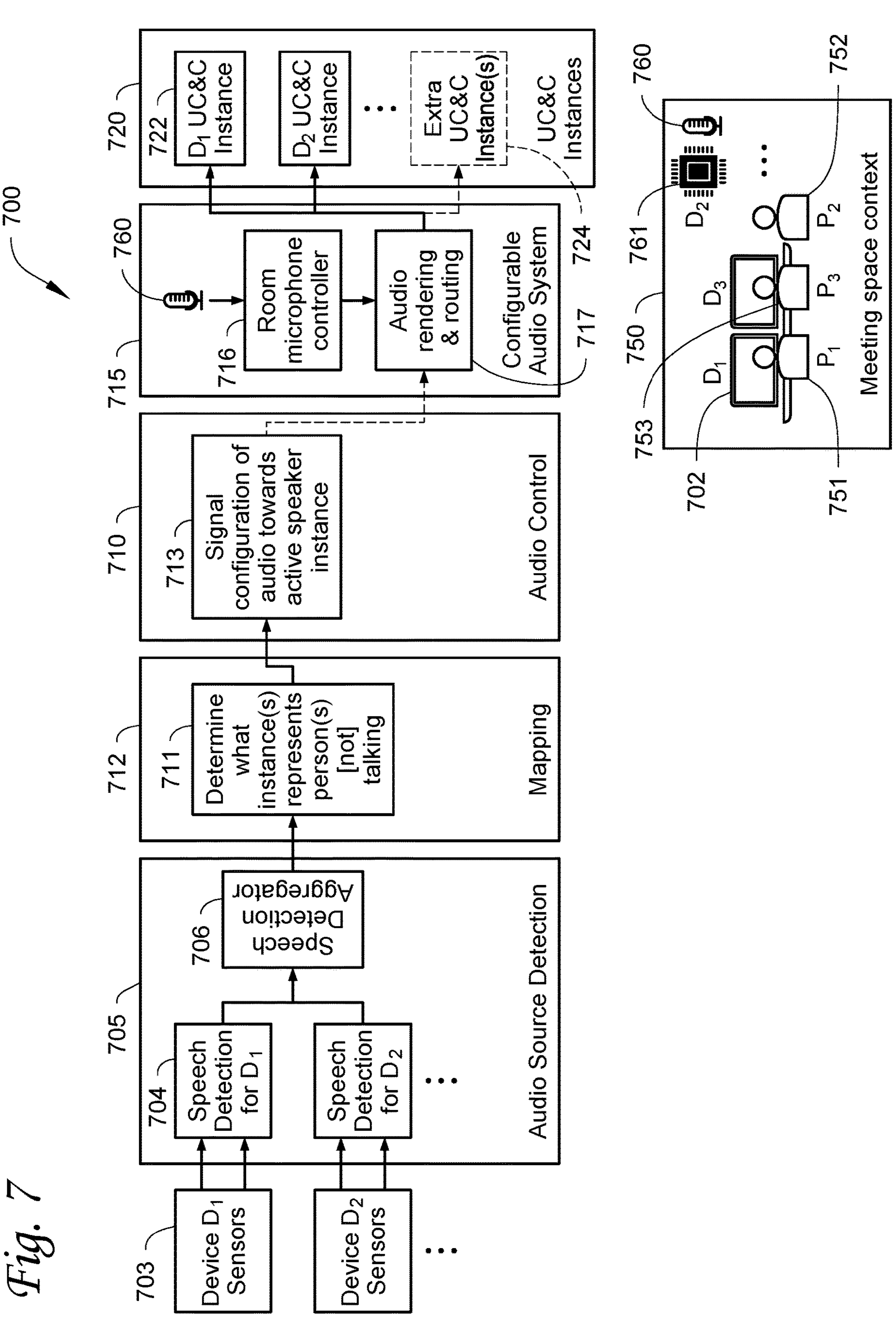

FIG. 7 illustrates a functional diagram of a system in which one of the active devices is a room system to which, among other things, the room audio can be connected, according to at least another example embodiment described herein.

Figure 8A:
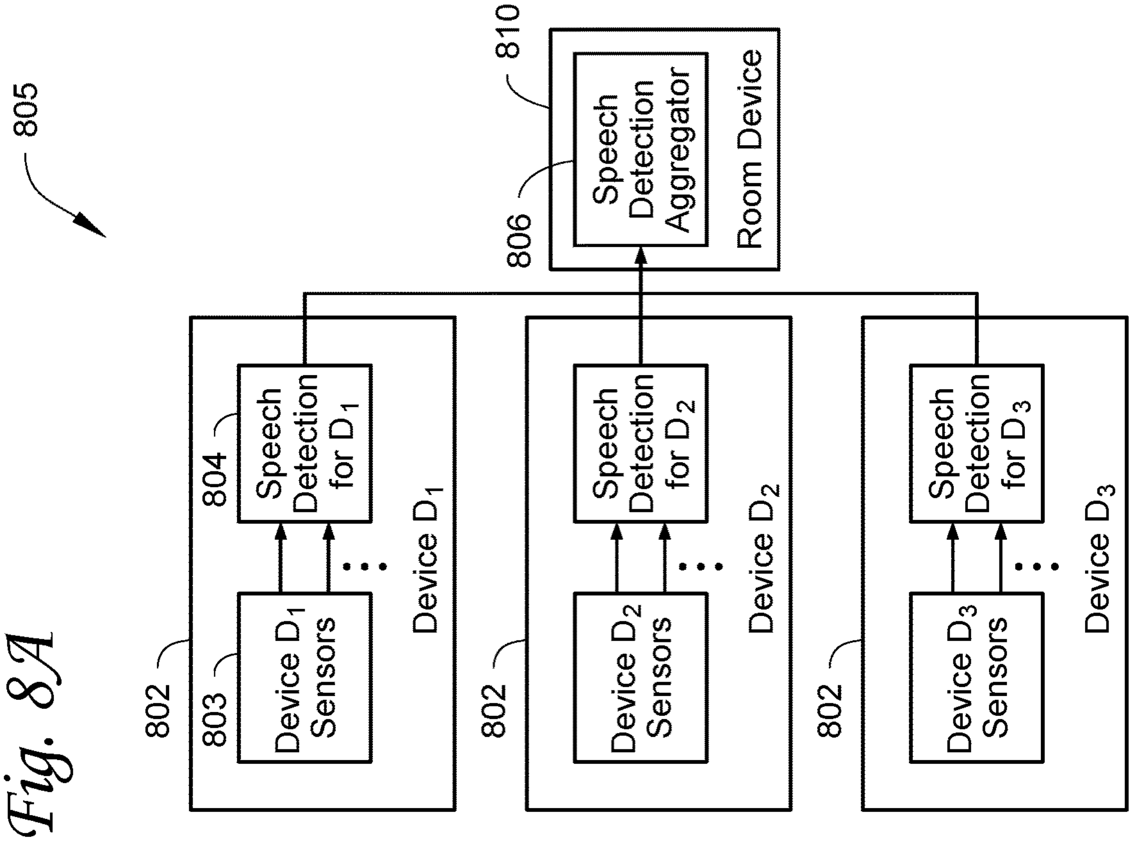

FIG. 8A illustrates a functional diagram of an audio source detection block, according to at least another example embodiment described herein.

Figure 8B:
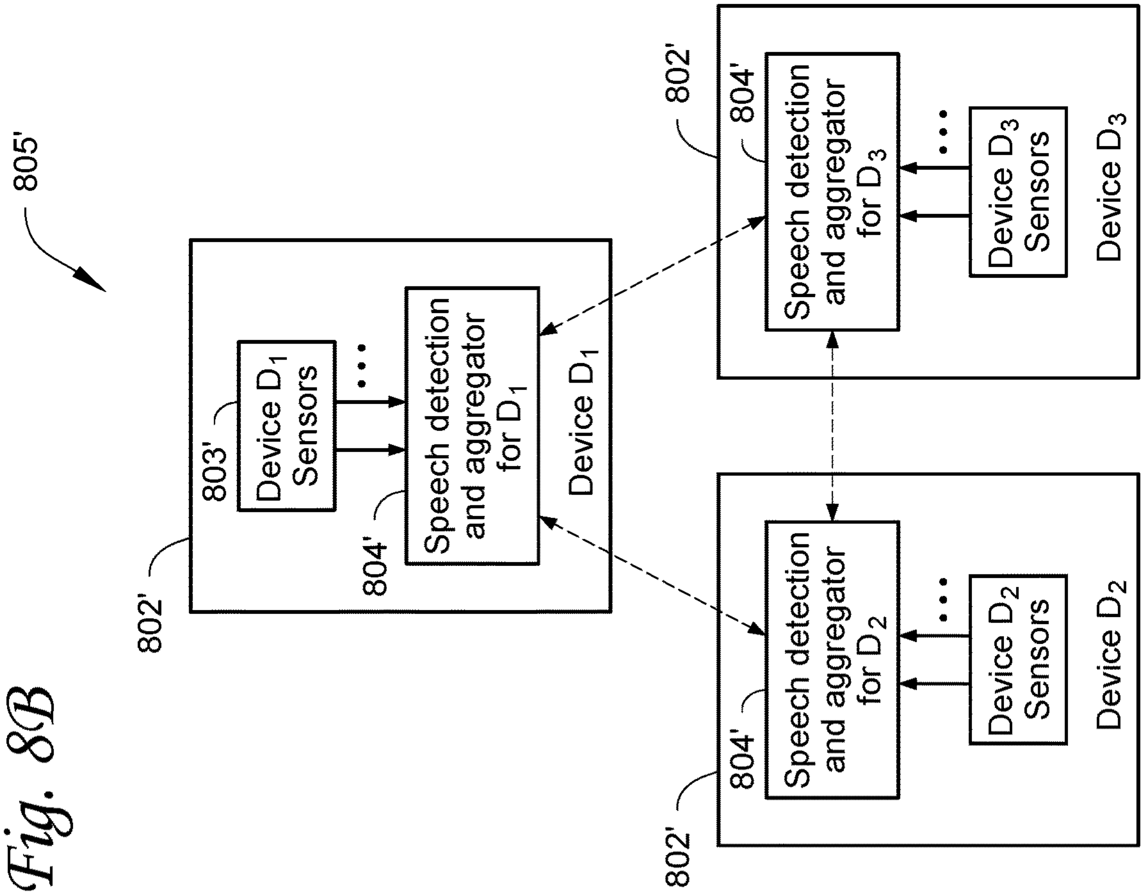

FIG. 8B illustrates a functional diagram of an audio source detection block, according to at least another example embodiment described herein.

Figure 9A:
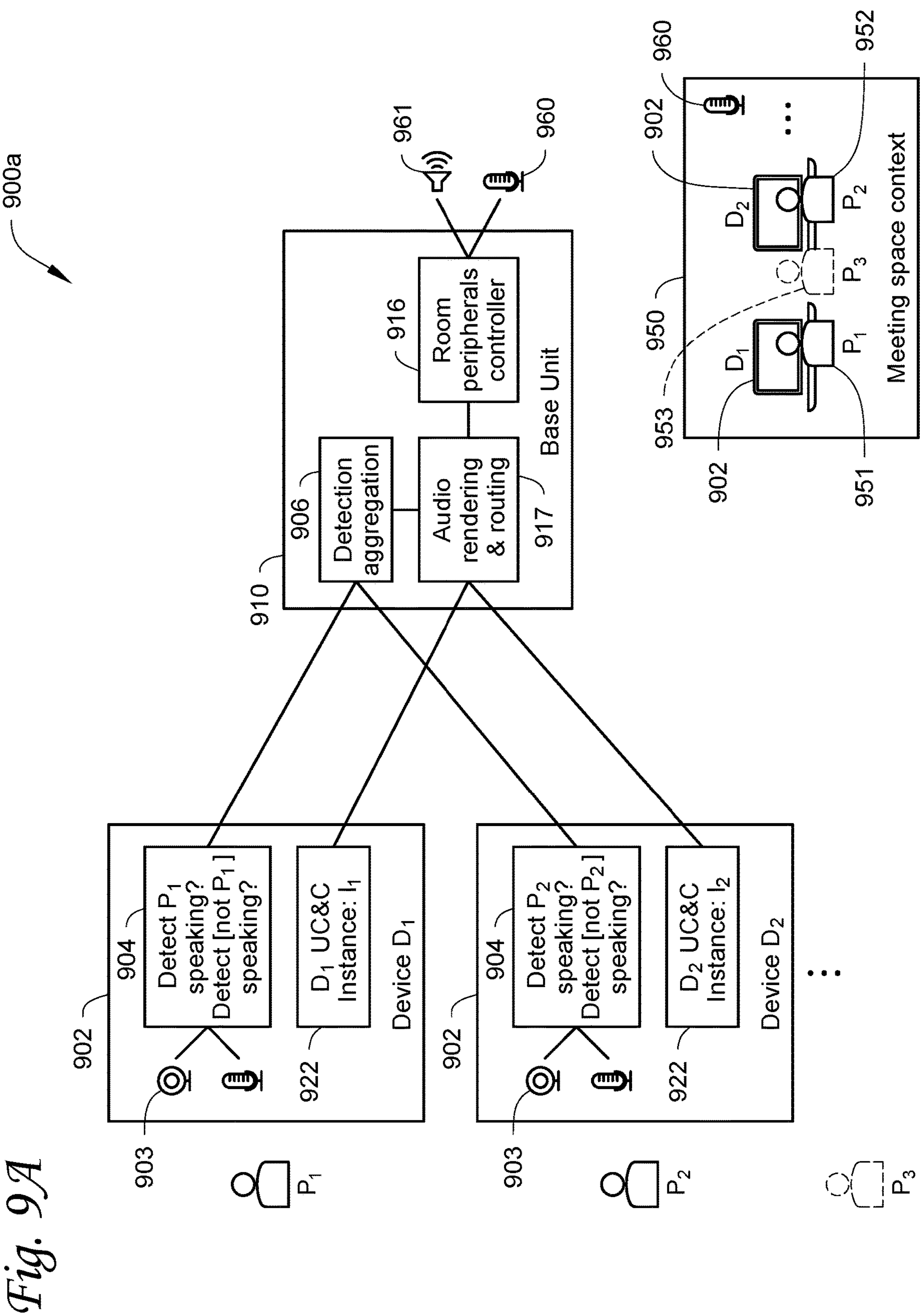

FIG. 9A illustrates a functional diagram of a system/device configuration, according to at least another example embodiment described herein.

Figure 9B:
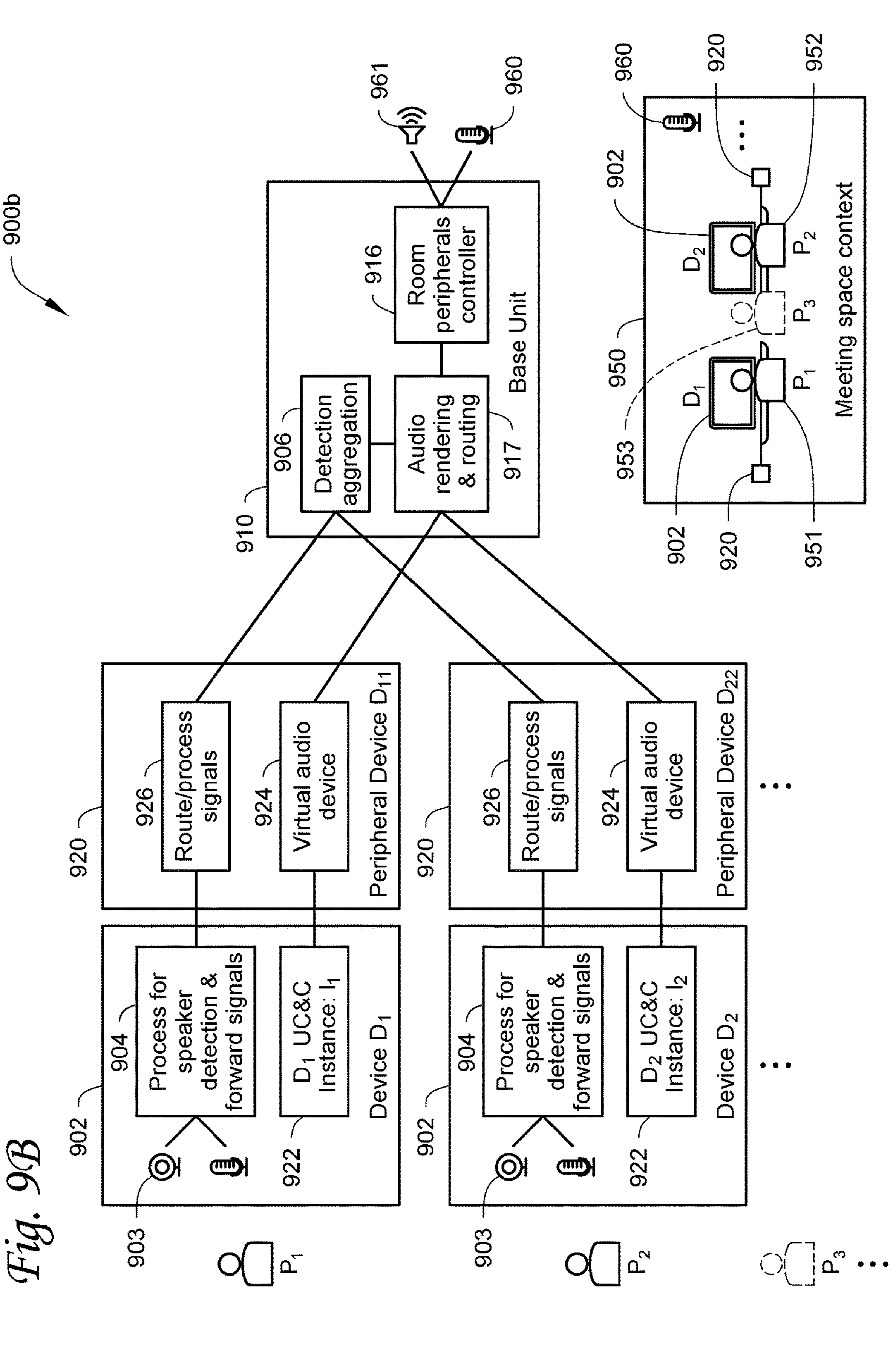

FIG. 9B illustrates a functional diagram of a system/device configuration, according to at least another example embodiment described herein.

Figure 9C:
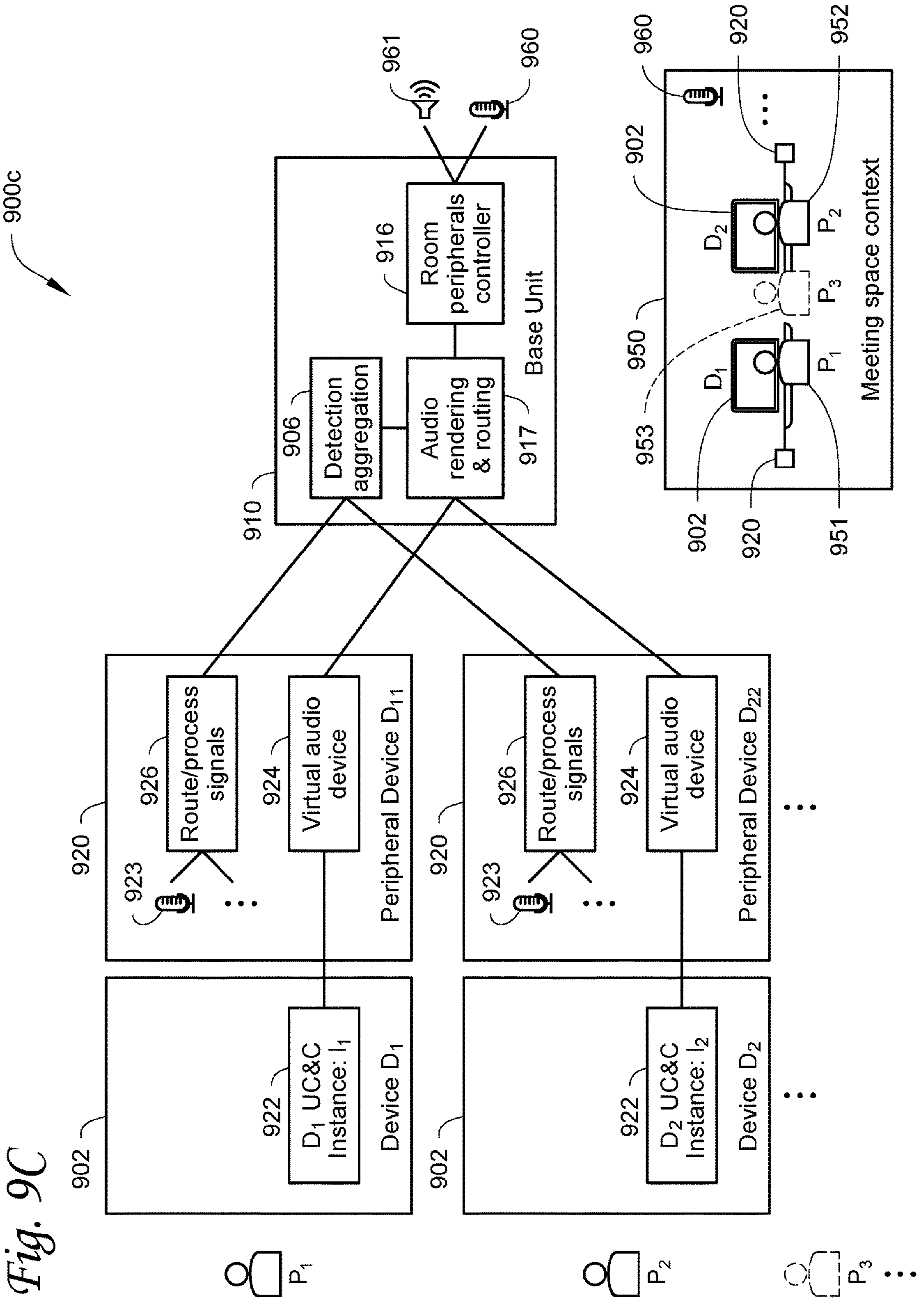

FIG. 9C illustrates a functional diagram of a system/device configuration, according to at least another example embodiment described herein.

Figure 10:
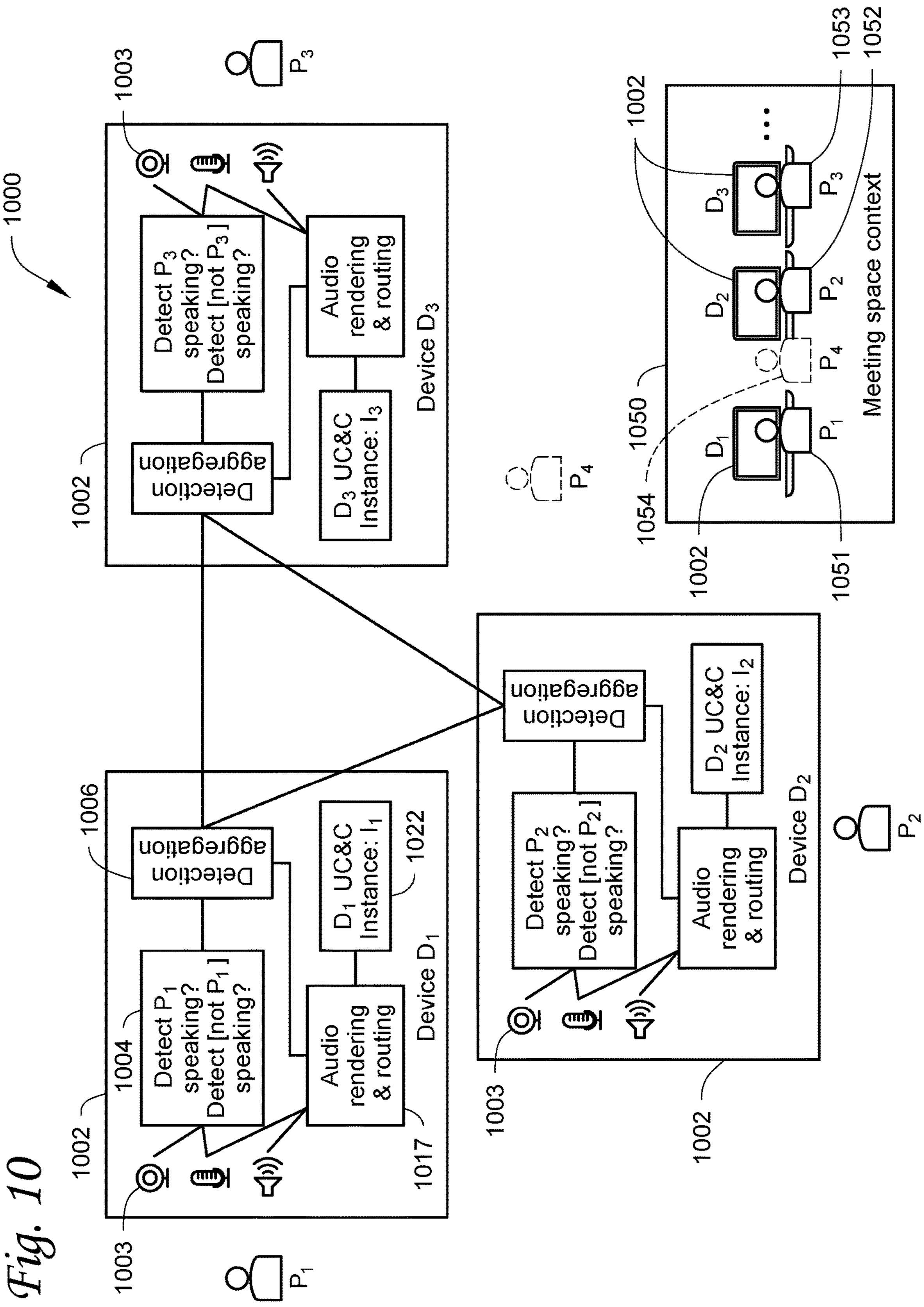

FIG. 10 illustrates a functional diagram of a system/device configuration, according to at least another example embodiment described herein.

Figure 11:
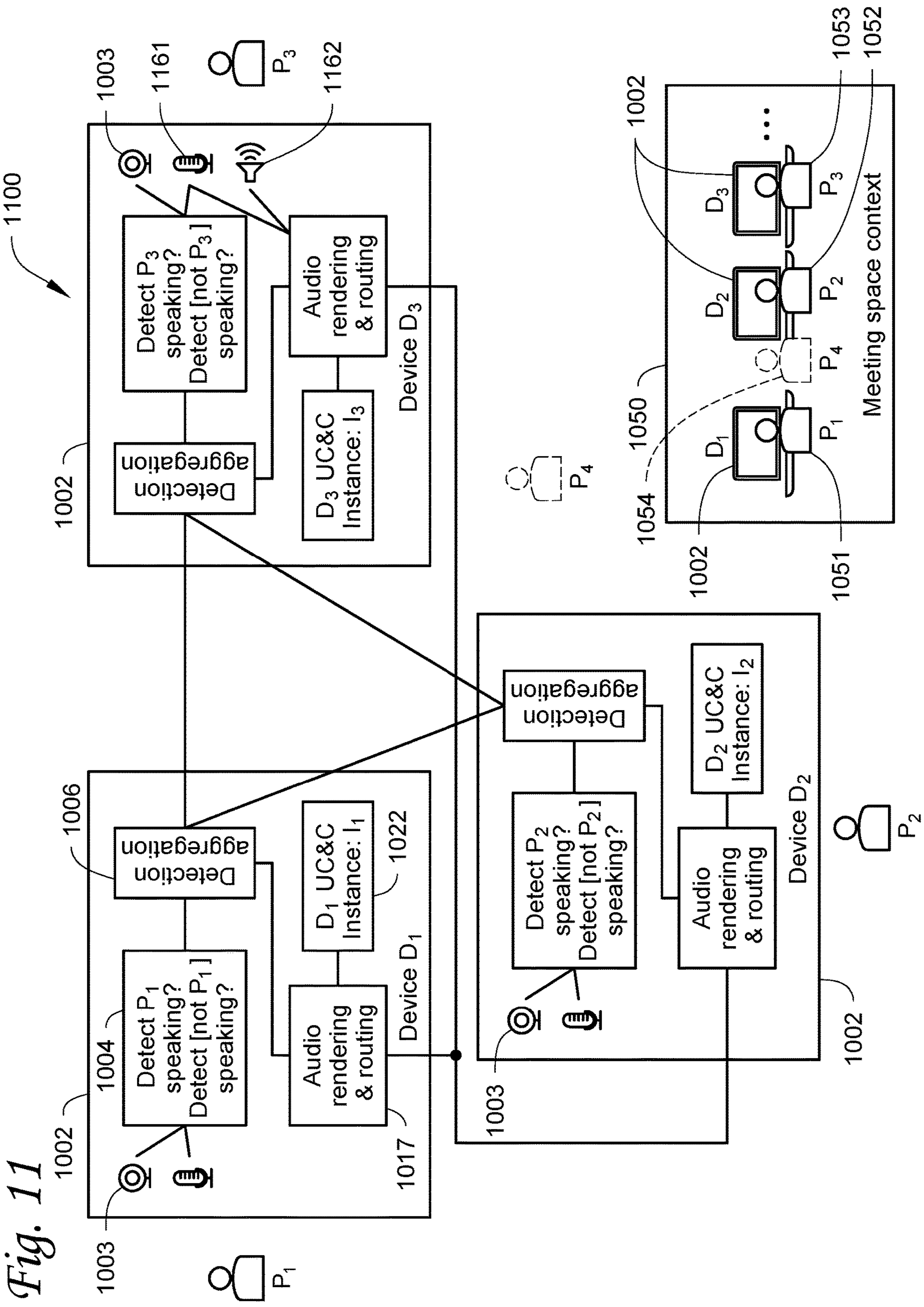

FIG. 11 illustrates a functional diagram of a system/device configuration, according to at least another example embodiment described herein.

Figure 12:
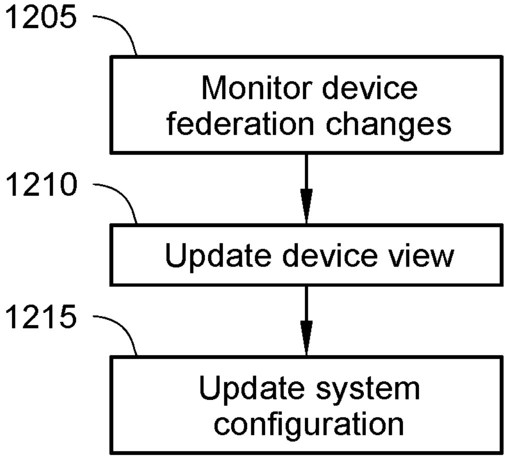

FIG. 12 illustrates an example federation system, according to at least another example embodiment described herein.

Figure 13:
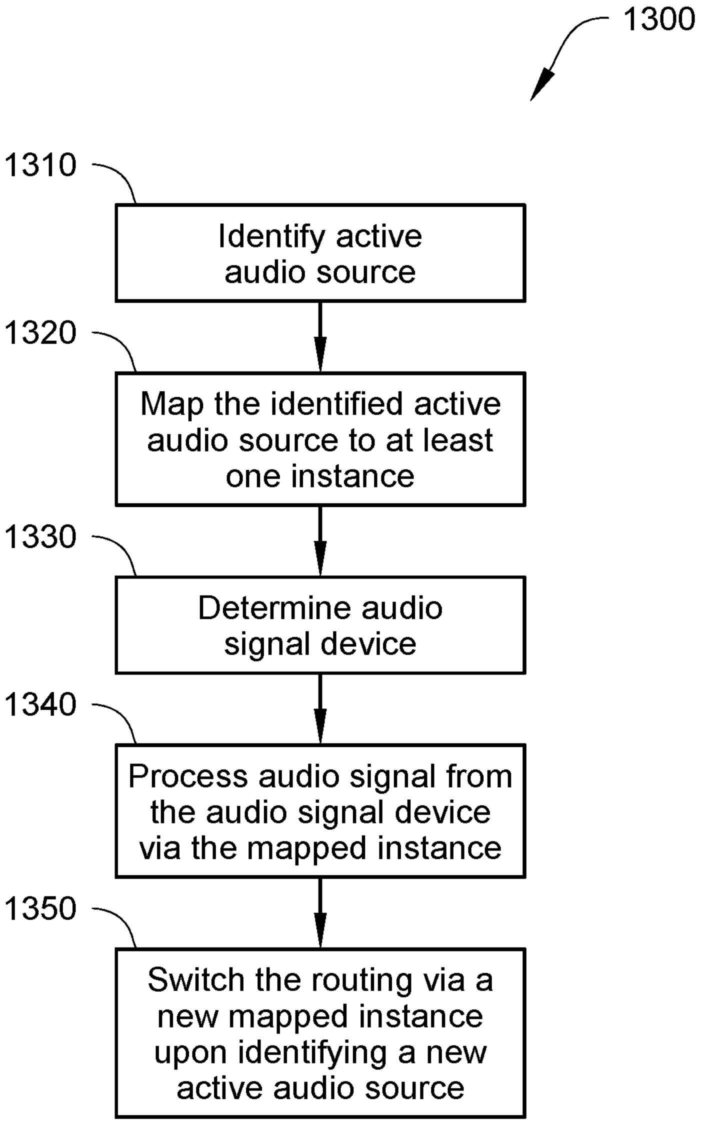

FIG. 13 illustrates an example processing flow for mediating an audio source, according to at least another example embodiment described herein.

Figure 14:
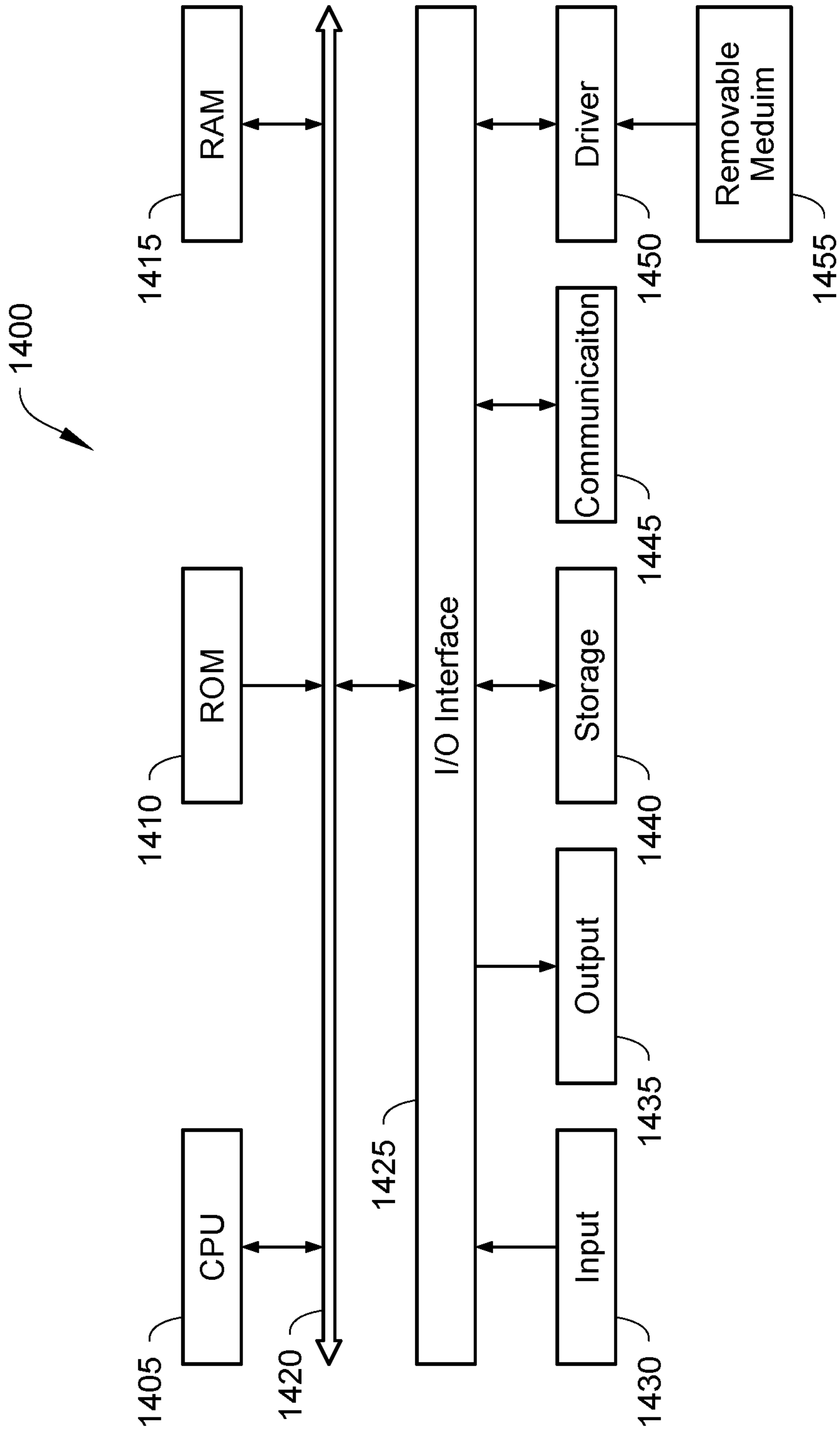

FIG. 14 illustrates schematic structural diagram of an example computer system applicable to implementing an electronic device, arranged in accordance with at least some embodiments described herein.

DETAILED DESCRIPTION

Embodiments of the present disclosure will be described more fully hereafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an" and "the" include plural references unless the context clearly dictates otherwise. Although any systems and methods similar or equivalent to those described herein may be used in the practice or testing of embodiments of the present disclosure, the preferred, systems and methods are now described.

Additionally, the present disclosure may be described herein in terms of functional block components and various processing steps. It should be appreciated that such functional blocks may be realized by any number of hardware and/or software components configured to perform the specified functions. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation.

As referenced herein, "communications and collaboration platform" may refer to an application realized by any number of hardware and/or software components configured to enable a group of participants or users to communicate and/or collaborate in real time, near real time, and/or for non-real-time applications (e.g., recordings, transcriptions, etc.). A communications and collaboration platform may provide a range of communication and collaboration tools that allow the group of participants or users to communicate and collaborate in real time or non-real time. On example of communications and collaboration platform may include a Unified Communications & Collaboration (UC&C) tool.

As referenced herein, "instance", "instance/login" or "instance or login" of or connected to a communications and collaboration platform may refer to any connections/services related to or provided by a communications and collaboration platform. Such a connection/service may relate to, for example to a virtual space, a representation, a presence, an identification, a history, and any associated services provided by the communications and collaboration platform for devices/applications connected to or supported by the communications and collaboration platform. It is to be understood that an instance, an instance/login, or an instance or login described herein may relate to a general source/sink of audio data from a producer/consumer of audio data.

As reference herein, “manipulate” or “manipulating” signals or audio signals may refer to processing and/or routing the signals via an audio system, as well as additional operations such as editing, modifying, transforming, or changing the signals via the audio system.

When there are multiple UC&C instances within a meeting space, it may not be sufficient to route audio signal to a single UC&C instance, regardless of the source of that sound. In a previous solution, any audio signal that is captured or emitted from the audio peripherals will be routed to the single UC&C instance, regardless of the audio source. For example, if a participant logs into the UC&C tool on a personal device within the meeting space, this UC&C instance will not be able to use the audio peripherals. Instead, the user will typically mute this device’s microphone and speaker. By doing so however, this user’s UC&C instance may not get proper highlighting in a user interface of the UC&C tool because no audio is detected. In addition, since UC&C tools typically prioritize users based on their audio (to ensure people who are talking are in view), when no audio is detected, such prioritization techniques may not work as expected for devices that do not have access to the room peripherals.

For example, as seen in FIG. 1, in which a hybrid meeting 100 is shown where multiple participants are calling in from the same meeting space, in which two participants are marked with the squares “1” and “2”. In this case, user or participant “1” has claimed the room peripherals and thus all audio from the meeting space is routed via this participant “1”. In the example, participant “2” is talking. Since the audio is routed via participant “1”, the UC&C tool highlights participant “1” on the user interface and gives this participant priority, e.g., resulting in a larger screen real-estate, regardless that participant “2” is talking. This is not the expected experience. When a participant is talking, and a video is available of that participant, it is expected that participant to be properly highlighted and prioritized. In some cases, participant “2” might even be hidden from the screen because it was not prioritized. So even though participant “2” is presenting, the remote participants may still see participant “1” in this case.

Another problem with such a solution is the conflict of having multiple audio systems in the same space, which can result in echoes, noise, and distortions. One typical solution from prior solutions to handle this is to disable all-but-1 audio system. When room audio is available, one would typically disable all other systems for example as the room audio system typically offers better quality. This coordination of multiple audio systems is however a frequent source of issues as users are often required to act themselves, and such manual coordination is prone to errors.

Embodiments described herein can solve the above identified problems related to previous solutions. Methods and systems are disclosed herein for mediating an audio source for a hybrid meeting on a communications and collaboration platform. At least one active audio source can be identified. The active audio source can be mapped to one or more instances connected to the communications and collaboration platform to determine a mapped instance. At least one audio signal source from multiple devices can be determined to capture audio from the active audio source. An audio system can be configured to route an active audio signal from the audio signal source via the mapped instance.

In one embodiment, a group of users at the same meeting space can be represented by more than one remote presence (e.g. by means of multiple instances or logins of a communications and collaboration platform). The users can have an audio signal routed through an audio device that is most relevant. This is in contrast to the previous solution to route the audio signal statically to a fixed device. By doing so, in an embodiment, the issue in which the incorrect instance or login is highlighted and prioritized may be mitigated, and the requirement to manually coordinate multiple audio systems may be removed.

FIGS. 2A and 2B illustrate the general differences of the present disclosure and the state-of-art, e.g., at a high-level description of the functional differences. It is appreciated that the disclosure is not intending to be limiting and may not contain all functional blocks/details, which are described further below.

FIGS. 2A and 2B illustrate situations in meeting platforms 200 and 250 with three participants 201, 202, 203 and 251, 252, 253, respectively, who have their own UC&C instances/logins, and one or more participants 204 and 254 who are connected externally, e.g., from outside, of the meeting platforms 200, 250 with their UC&C instance/login. While only one remote participant is shown, such illustration is not intended to be limiting and multiple remote participants (either individual or connected from different meeting spaces) may be connected to the UC&C meeting.

In FIGS. 2A and 2B, the microphones 210, 260 denote the room microphone in this example embodiment and the laptop of participants 201 and 251, e.g., denote the user that, on the left side, has taken control of the room devices, respectively, e.g., the users are the ‘host’. It is understood that even though a laptop is shown, this device may also be a meeting room device that provides its own instance/login to the UC&C tool, e.g., other processor enabled device. In an embodiment, intermediary devices may be used to pass the signal from the microphone to the host device, e.g., to the laptop.

The meeting platforms 200 and 250 may further include two other participants 202, 203 and 252, 253, respectively, e.g., non-host users/participants are also in the meeting space, each with their own device that has a UC&C instance/login. In an example embodiment, one of the participants 203 and 253 is talking, which is symbolized with the text balloon.

In such a situation, as illustrated in FIG. 2A, the prior solutions include a connection being made between the microphone 210 and the host device of the participant 201 that facilitates an audio data stream from the room microphone 210 to the host device of the participant 201. This connection is typically fixed during runtime operation. Within the device, the signal is routed to a UC&C instance 220—exemplary symbolized with the Teams logo here, but may be other meeting collaboration tools, such as, Zoom, Skype, etc.—which is illustrated by the dotted line moving into the Teams backend. The audio systems of the non-host devices, e.g., devices of participants 202, 203, are typically required to be disabled (‘muted’), whereas the audio system of the host device, e.g., of participant 201, is replaced by the room audio system. It is typically tasked to the users to configure these devices accordingly, with an error-prone system as a consequence.

As seen in FIG. 2A, the participant 203 is talking, in which the sound of this participant 203 is picked up by the room microphone 210, and routed to the host device of participant 201, followed by a routing to the UC&C instance/login of the host device of participant 201 and sent to the UC&C backend 220. Because of this, the remote participant 204, shown at the bottom of the left side of the figure, gets an indication by means of a highlight (indicated by the purple rectangle in this embodiment) that the participant 201 having the host device instance/login is talking because that is where the audio signal is active. This is opposed to the expected user experience where the participant 203 that is talking should be highlighted instead of the host device participant 201. In addition to the speaker highlight, the active audio is also typically used in UC&C tools to prioritize who to show when and potentially how large in the remote participants UC&C client. When screen real-estate is sparse, e.g. when there is a large meeting with many people calling in, or when content is being shared and only very limited participant videos may be shown, the active audio may be used to determine which UC&C instance/login gets priority over another UC&C instance/login. With the prior solutions, this does not work properly because the audio is not effectively accompanied or associated with the correct speaker having their own UC&C instance/login, e.g., participant 203.

FIG. 2B illustrates a high-level principle of the system according to an example embodiment. Instead of a fixed connection between the room microphone 260 and the host device of participant 251, a toggle may be introduced that is configured to switch the room audio to the device of the participant that represents the active speaker. By doing so, the associated or mapped UC&C instance/login may be used to route the audio signal to the UC&C backend 270. The system also switches a highlighting of the mapped instance on a user interface of the communications and collaboration platform to the newly mapped instance, resulting in a remote participant 254 experience that matches the expectations of the user by offering correct highlighting of the participant 253, e.g., the person talking, and correct prioritization that enables the UC&C system to give the speakers video the proper focus.

In an embodiment, all the laptops may be configured to use a 'virtual' audio system that adapts according to who is speaking. Accordingly, a single process may be offered that may not require users to change settings depending on their role in the meeting. Instead, a fixed configuration may be used and typically no user interactions are needed to configure this. This is an improvement over the prior solutions by being able to identify the proper speaker/participant during a meeting.

FIG. 3 illustrates an example block diagram of a system 300 for mediating an audio source for a hybrid meeting on a communications and collaboration platform, according to at least one example embodiment described herein. It is appreciated that while systems are discussed herein as having discrete components, blocks, or units, such disclosure is not intending to be limiting. The systems, or at least some of their respective components, blocks, or units described herein may be implemented by an application (e.g., a software application or service) or other downloadable program that when executed by a processor-enabled device (e.g., a portable computing device, a desktop computing device, etc.) can perform systems, blocks, components, or units as discussed herein. In one example embodiment, the system 300 may have its components being implemented by a software application which can be downloaded to and executed by a participant's computing device, or a base unit (e.g., a desktop computing device) in a meeting space, for example, a physical meeting space. It is to be understood that a base unit, in various embodiments described herein, such as depicted in FIGS. 8A and 9A-C and other figures, may be a separate device, or may have its functionality integrated in various devices such as, e.g., a camera device, a display, an all-in-one device, as downloadable or installed program or application, etc.

The system 300 includes an audio source detection module 305 configured to identify at least one active audio source, for example, in a physical meeting space. The audio source detection module 305 can be configured to receive at least one of audio data, video data, or metadata 301 from multiple devices in the meeting space. The devices may include, for example, devices used by participants in the meeting space such as a portable computing device (e.g., a laptop), audio/video peripherals or devices associated with a portable computing device, room audio/video peripherals (e.g., a room microphone, a room speaker, etc.), a desktop computing device, a base unit of a communications network, etc. The audio source detection module 305 can be configured to determine, based on the received audio data, video data, or metadata 301, an active audio device from the multiple devices for the identified active audio source.

The audio source detection module 305 may include a detection aggregator to aggregate the received audio data, video data, or metadata into a consensus to determine the active audio source. In some cases, the detection aggregator may be a centralized detection aggregator hosted by a base unit or device in the meeting space. In some cases, the detection aggregator may be distributed among at least some of the devices. It is to be understood that a base unit, in various embodiments described herein, such as depicted in FIGS. 8A and 9A-C and other figures, may be a separate device, or may have its functionality integrated in various devices such as, e.g., a camera device, a display, an all-in-one device, as downloadable or installed program or application, etc.

In one example embodiment, the audio source detection module 305 can identify an active audio source when a participant is talking in front of a device. For example, when the participant is using a laptop for attending the meeting, the audio source detection module 305 can detect whether the participant is talking in front of the laptop by analysing a video feed of a webcam of the laptop to estimate whether the person in front of the laptop is talking. The audio source detection module 305 may combine the video feed with an audio feed, for example from the laptop microphone, to increase confidence of the detection. By aggregating results of the different devices (e.g., webcam, laptop microphone, etc.), the audio source detection module 305 can create an audio source detector.

In one example embodiment, the audio source detection module 305 can identify an active audio source by analysing signals from various devices. For example, when participants are using different microphones (e.g., laptop microphones) in a meeting space, the audio source detection module 305 can detect and analyze the signals from the microphones in terms of volume, reverb amount and other audio properties. By analyzing the signals, the audio source detection module 305 can create an additional estimation of which microphone is near to the active audio source (e.g., a speaker).

The system 300 further includes an instance detection module 310 configured to map the active audio source 303 identified by the audio source detection module 305 to one or more instances 325 connected to the communications and collaboration platform to determine a mapped instance 307. In some cases, the mapped instance 307 may be an existing instance of the communications and collaboration platform. In some cases, the mapped instance 307 may be a newly created or activated instance which can be triggered by the detection of the active audio source 303. In an embodiment, an instance can be created or activated when an active audio source is not associated with one of the existing instances, or not associated with an active audio device. For example, in an embodiment, when a participant is detected to be talking without an active device, the system 300 may create a new instance to represent the participant in the communications and collaboration platform.

The instance detection module 310 can determine whether the identified active audio source is associated with the active audio device. When the identified active audio source is associated with the active audio device, the instance detection module 310 can designate one of the instances 325 associated the active audio device as the mapped instance. In some cases, the mapped instance of the communications and collaboration platform is associated with a base unit or room system (e.g., a desktop computing device or other suitable devices connected to the communications and collaboration platform) in the meeting space and connected to a communications network. It is to be understood that a base unit, in various embodiments described herein, such as depicted in FIGS. 8A and 9A-C and other figures, may be a separate device, or may have its functionality integrated in various devices such as, e.g., a camera device, a display, an all-in-one device, as downloadable or installed program or application, etc. In some cases, the mapped instance of the communications and collaboration platform is associated with a portable computing device (e.g., a laptop used by a participant). When the identified active audio source is not associated with the active audio device, the instance detection module 310 can designate one of the instances 325 as the mapped instance.

The system 300 further includes an audio control module 315 configured to determine at least one audio signal source from multiple devices in the meeting space for the identified active audio source. The audio control module 315 can further configure a configurable audio system 320 in the meeting space to process and/or route an active audio signal from the determined audio signal source via the mapped instance, upon an identifying of a new active audio source, determine a new mapped instance corresponding to a new active audio source. It is to be understood that when an audio system is configured to process and/or route an active audio signal, the audio system can perform various functions on the active audio signal, including, for example, signal routing, signal processing, signal controlling, etc., for various data signals including, for example, audio stream(s) from device(s) to instance(s), audio stream(s) from instance(s) to device(s), audio stream(s) that are exchanged among devices connected to the audio system, etc.

The audio control module 315 can compare audio signals from at least some of the devices to determine the audio signal source. In some cases, one or more room audio peripherals such as, for example, a room microphone, may be designated as the audio signal source. In some cases, the audio signal source may include an audio device associated with a portable computing device such as, for example, a laptop of a participant. The audio control module 315 may further configure the audio system 320 to mute the audio devices except for the determined audio signal source/device.

As described above, FIG. 3 shows a high-level functional diagram of the system 300 according to an example embodiment. It is to be understood that functional blocks 305, 310, 315, 320, and 325, e.g., may be included as software or hardware or combination thereof, for identifying the speaker, e.g., participant, during a meeting. Functional blocks 305, 310, 315, 320, and 325 will be further described below.

First functional block 305, referring to an audio source detection module in this embodiment, may be responsible for identifying active audio source(s). In an embodiment, an audio source may be defined at different levels depending on various implementations. For example, an active audio source might be a person or object that makes a sound. An audio source may also refer to a participant in front of an audio device, or a device suitable to capture audio signal(s) from the participant. An audio source may be an audio device, or a device suitable to capture audio signal(s), and may not necessarily be a producer of the audio signal(s). An audio source may be a sub-signal of the signal captured from a device, e.g., the speech from a participant x captured on device y. It is to be understood that the device y may capture other audio as well, such as speech from another participant, background noise, room audio playback, etc.

The audio source detection module 305 may consider various factors to determine whether a peripheral audio device is suitable to capture signal(s) from a participant. For example, the factors may be related to the estimated distance from a sensor of a device (e.g., preferably a nearby sensor rather than a far-away sensor), audio quality (e.g., preferably a sensor that picks up the signal with better quality), sound source versus device relation (e.g., detect person talking sitting in front of the device), etc. Sources of audio may be any utterance of audio signals, audible or inaudible. Even though sometimes the term speech is used, the system 300 is not restricted to speech from one or more participants, and may be used to refer to any type of audio sources.

Second functional block 310, referring to an instance detection module in this embodiment, may be used to map an active audio source to an instance of the communications and collaboration platform, e.g., which UC&C instance/login maps to what audio source. This mapping function can specify to which UC&C instance/login the active audio source is to be routed to. For example, in an embodiment, when participant $P_1$ is speaking in front of a user device (e.g., a laptop) that has UC&C instance/login $I_1$, the instance detection module 310 can map participant $P_1$ to $I_1$ when participant $P_1$ is represented in the UC&C platform with that specific instance/login $I_1$. When participant $P_2$ is speaking, not in front of a user device (e.g., a laptop), the instance detection module 310 may map that participant $P_2$ to a default instance $I_{def}$, for example, the instance of the nearest participant, or another type of mapping. When the audio source is, in a certain implementation, a device that has a UC&C instance/login associated with it, the instance detection module 310 may designate the UC&C instance that is running on the device as the mapped instance for the specific "device" audio source. In some cases, the instance detection module 310 may map a certain audio source with no instance. In other words, the audio source may not be ingested to the UC&C platform. It is to be understood that a mapping may not have a one-to-one correspondence. Multiple audio sources may be mapped to a single UC&C instance/login, or multiple UC&C instances/logins may be mapped to a single audio source, in addition to one-to-one mapping of a UC&C instance on an audio source. In an embodiment, the instance detection module 310 may dynamically determine the mapping which may change in real time.

Functional block 315, referring to an audio control module in this embodiment, may be used for configuring the configurable audio system 320 that it is connected to. The audio control module 315 can send instructions 317 to the audio system 320 which can execute actions to enable the identified active audio source to be sent to the determined UC&C instances/logins. The audio control block 315 may also be used for identifying an active audio signal 322 that can be used to represent the active audio source. In some cases, a device that detects the active audio source may be determined as the audio signal source or device, i.e., a device that captures the active audio source. In some cases, the audio control block 315 may determine a different component or device that is more relevant to capture a certain audio signal than the device that detects the active audio source. This identification and mapping between the audio source and the signal source component or device can be static. For example, a high-quality room audio microphone always may be used to capture any audio signal in the room that is sent to a UC&C instance/login. In some cases, the audio control module 315 can dynamically determine the audio signal source based on conditions, priorities and preferences at any given time. In addition, the audio control block 315 may be configured to be aware of the processing and/or routing capabilities of the configurable audio system 320 and may configure these processing and/or routing capabilities depending on the situation at hand. For instance, processing and/or routing components of the audio system 320 can be available to handle echo, reverb or quality enhancements or to (de)multiplex audio signals.

Functional block 320, referring to a configurable audio system in this embodiment, may represents one or more components that are can be used for delivering the relevant (processed) audio signals 322 and control signals 323 to the relevant destinations. A configurable audio system can, without limitation, include signal switchers, signal (de) multiplexers, signal processing components, etc. Each of these components can be configurable and default value can be provided for these configurable components.

A suitable audio system described herein can be configured to have various functionalities such as, for example, dynamic signal routing and processing for routing and processing data signals in general. The audio control module can configure the audio system to process one or more audio signals based on the active audio signal between the instances and the devices connected to the audio system. It is to be understood that the audio signals can be processed and/or routed to adapt to the detected active audio source, and may not be the same as the active audio signal from the active audio source to the mapped instance. That is, the active audio signal may not be delivered to the mapped instance "as-is". Instead, certain transformations can be done to the signal by suitable signal processing and/or routing. For example, in an embodiment, the audio control module can configure the audio system to filter the active audio signal to obtain a specific voice signal of a participant. In an embodiment, the audio control module can configure the audio system to dynamically route an audio signal from/to one of the instances. For example, an audio system can be configured for echo cancellation at various levels for in/out signals of devices linked to the configurable audio system. The audio control module can configure the audio system to re-route the audio signal from the mapped instance associated with a room speaker based on any suitable echo cancellation logic. It is to be understood that a configurable audio system described herein may perform signal routing and/or processing for various data signals including, for example, audio stream(s) from device(s) to instance(s), audio stream(s) from instance(s) to device(s), audio stream(s) that are exchanged among devices connected to the audio system, etc.

Functional block 325, referring to UC&C instances in this embodiment, may be configured to receive the audio signal(s) from the configurable audio system. UC&C instances refer to instances of a UC&C platform or tool. It is to be understood that a UC&C instance can include any component in hardware and/or software that can provide/generate and/or receive/use audio signals. UC&C tools are one such example via which the audio can be signalled to local and remote participants. The UC&C instances can include any suitable instance of a communications and coloration platform or tool. The disclosure is not intending to be limited to these types of platforms or tools.

FIG. 4 shows a functional diagram of a system 400 according to an embodiment. It is appreciated that while systems are discussed herein as having discrete components, blocks, or units, such disclosure is not intending to be limiting. The systems, or at least some of their respective components, blocks, or units described herein may be implemented by an application (e.g., a software application or service) or other downloadable program that when executed by a processor-enabled device (e.g., a portable computing device, a desktop computing device, etc.) can perform systems, blocks, components, or units as discussed herein. In one example embodiment, the system 400 may have its components being implemented by a software application which can be downloaded to and executed by a participant's computing device, a base unit (e.g., a desktop computing device) in a physical meeting space, a peripheral device (e.g., connected to a participant's computing device), or any other suitable device. It is to be understood that a base unit, in various embodiments described herein, such as depicted in FIGS. 8A and 9A-C and other figures, may be a separate device, or may have its functionality integrated in various devices such as, e.g., a camera device, a display, an all-in-one device, as downloadable or installed program or application, etc.

As shown at the bottom right of the figure, a physical meeting space 450 is provided in which there is a room microphone 460 available, as indicated by a microphone symbol. Each participant $P_1$ 451, $P_2$ 452 in the physical meeting space 450 can be associated with an active device or user device 402 (e.g., user device $D_1$, $D_2$). It is to be understood that more than two participants Px may be in the physical meeting space 450 to attend the meeting, and each may have or be associated with an active device Dx 402. Each active device 402 may have a UC&C instance/login 422 associated with it. Exemplary active device 402 may include a user device including a portable computing device such as, for example, a laptop, a mobile phone, a tablet, a desktop computer, a next unit of computing (NUC) device, a head-mounted device, etc. Moreover, even though the following embodiments are presented as distinct embodiment, the learnings, variations, blocks, functions, and observations may be interchangeable between the different embodiments and are not exhaustively repeated throughout the embodiments. The notes and variants of the other embodiments remain valid and applicable for this embodiment.

Still further, even though two participants are represented with an active device, this should not be considered as limiting, and there can be an arbitrary number of active device users or participants. In some cases, there may be at least two participants in the meeting space 450.

The audio source detection block 405 may include two or more speech detection units 404 each being configured to receive sensor data from device sensors 403 of the active devices Dx 402. The device sensors may include, for example, a microphone, a speaker, a camera, etc. The audio source detection block 405 may use audio, video or other modalities or metadata from the devices 402, or from other sources in the meeting space 450 to detect whether a participant associated with the device is talking, i.e., whether the participant in front of one device 402 is the active audio source. The audio source detection block 405 can derive speech detection from audio, video, or metadata or a combination thereof from the active devices. The results can be accompanied with a measure of confidence on the detection. As referenced herein, "confidence" may refer to a probability or a confidence score representing the level of certainty on the detection, which may be based on the strength and consistency of the signal(s) being detected. The audio source detection block 405 may use sensor data of other devices (e.g., devices in the meeting space 405 other than the devices Dx). In addition, the audio detection block 405 may use additional data exchanges between either the other speech or audio detection blocks or other components in the system 400. These additional connections are deemed implementation dependent, and do not alter the embodiment in any way.

The audio detection block 405 may include a detection aggregator 406 that may be used on the individual detection results from speech detection unit 404 to aggregate them into a consensus. In one example embodiment, the amount of simultaneous audio sources may be restricted to one. When more than one device indicates that audio is detected, one of the devices may be selected. The detection aggregator 406 may implement the selection by taking into account confidence information of the individual detections 404, temporal consistency, prior information on feasible audio switching guidelines, etc.

The output signal of the audio source detection block 405 may be an indication of the identified device for which the detection aggregator 406 determines that the participant who is using the device is talking. In an example embodiment, the amount of simultaneous audio sources may be restricted to one, e.g., the one with the highest confidence. In another example embodiment, the amount of simultaneous audio sources may include two or more. For example, when two or more participants are detected to be speaking, instead of using one audio stream for the multiple simultaneous audio sources, the system 400 can demultiplex the detected audio signals from the multiple simultaneous audio sources to have multiple audio streams to be sent to multiple different UC&C instances associated with the audio sources.

When the speech detection unit 404 and/or the detection aggregator 406 determines that no participant who is using the device is talking, a corresponding message such as, e.g., an explicit 'no-one is talking' message, can be signalled, or in some cases, no signal is sent to implicitly indicate that no participant is talking. Various signalling mechanisms can be used for suitable implementations.

The audio control block 410 may receive the output signal e.g., a "device is talking" signal from the audio source detection block 405, and map, via a mapping function 411 at mapping block 412, the device Dx to a UC&C instance ly from one or more UC&C instances/logins 422 of the UC&C tool 420. It is to be understood that the UC&C tool and its associated instances can be other communications and collaboration platforms or tools and associated instances. The audio control block 410 may further identify the signal source(s) for the audio source(s) Dx at block 413, and configure the configurable audio system 415 at block 414 to send a proper audio signal to the mapped UC&C instance/login that represents the participant who is talking via the relevant signalled device. In this embodiment, the mapped UC&C instance/login (e.g., UC&C instances $I_1$ or $I_2$ of the UC&C tool 420) is determined to be directly related to the signalled device (e.g., device $D_1$ or $D_2$ connected to the UC&C tool 420), and the audio signal to be routed to the UC&C instance/login 422 is determined to be the signal from the room microphone 460. The audio control block 410, in this embodiment, can signal the audio signal captured from the room microphone 460 (for example) and route the captured signal to the UC&C instance/login of the device that was identified by the audio source detection block 405. In addition, the audio control block 410 may also configure the configurable audio system 415 when no participant is identified to be talking. In some cases, the audio control block 410 may choose to keep the audio signal routing unchanged when no participant is identified to be talking. In some cases, the audio control block 410 may choose to route the audio signal to a default device instead, or choose to mute the audio signal, etc. These choices are deemed implementation dependent.

The configurable audio system block 415 may allow for audio components thereof to be adapted and configured to various conditions in real time or non-real time. This can include altering audio streams including, e.g., splitting out multiple people talking into separate audio stream that represent individuals talking, altering the quality of the audio signal, combining multiple audio signals, routing audio signals from different sources to different destinations, etc. In this embodiment, the configurable audio system block 415 includes a room microphone controller 416 to control audio signals from the room microphone 460 to be routed to a certain device via a configuration parameter. When the audio control block 410 indicates, for example, that the room microphone audio signal should be sent to the UC&C client on device $D_1$, the configurable audio system 415 may be configured to make the necessary changes to enable this. When the configurable audio system 415 cannot make the change, a corresponding signal can be sent back to the audio control block 410.

The configurable audio system block 415 may communicate with the UC&C instance(s)/login(s) 420 and include an audio rendering and routing unit 417 to allow the UC&C instance(s)/login(s) 420 to use the relevant audio signal(s). In one embodiment, this may involve re-routing audio streams that are exchanged with the UC&C instance(s)/login(s). In another embodiment that may involve adapting the streams to facilitate a desired effect, e.g. adapting the audio stream towards one UC&C instance/login by ingesting silence (e.g., inserting a silence signal or a zero-signal that represents silence) while the audio stream towards a second UC&C instance/login is adapted to represent the non-silent audio signal. The active audio signal can be processed and/or routed by generating audio signals to emulate the active audio signal. To emulate audio streams, the configurable audio system block 415 can generate signals that simulate audio sources and destinations connected to the UC&C platform. For example, the active audio signal can be processed and/or routed to emulate audio streams by inserting a silence signal when no active audio signal is to be routed.

In yet another embodiment, other data communication can be used to facilitate the desired effect of ensuring the proper audio stream(s) are ingested in the proper UC&C instance(s)/login(s) such as applying a (un)mute operation to the UC&C instance(s)/login(s) 420. This embodiment for example allows multiple users/participants in a meeting space to have an active connection to the UC&C instance/login without needing to worry about issues with undesired audio effects (e.g., audio echo or distortion). In addition, the configurable audio system block 415 can route the room audio to the most relevant device automatically which allows the user and UC&C tool to work properly with correct, high-quality room audio.

FIG. 5 shows a functional diagram of a system 500 according to another embodiment. It is appreciated that while systems are discussed herein as having discrete components, blocks, or units, such disclosure is not intending to be limiting. The systems, or at least some of their respective components, blocks, or units described herein may be implemented by an application (e.g., a software application or service) or other downloadable program that when executed by a processor-enabled device (e.g., a portable computing device, a desktop computing device, etc.) can perform systems, blocks, components, or units as discussed herein. In one example embodiment, the system 500 may have its components being implemented by a software application which can be downloaded to and executed by a participant's computing device, a base unit (e.g., a desktop computing device), a peripheral device (e.g., connected to a participant's computing device), or any other suitable device, for example, in a physical meeting space. It is to be understood that a base unit, in various embodiments described herein, such as depicted in FIGS. 8A and 9A-C and other figures, may be a separate device, or may have its functionality integrated in various devices such as, e.g., a camera device, a display, an all-in-one device, as downloadable or installed program or application, etc.

In the embodiment depicted in FIG. 5, users or participants (e.g., $P_3$ 553 in this case) without an active device $D_x$ are also in the meeting space 550 as shown at the bottom right of the figure. In a first variant of the embodiment, the participants without an "active" device $D_x$ can be represented to the UC&C tool 520 via the UC&C instance/login 522 of one of the devices $D_x$. In a second variant, the participants without an active device $D_x$ can have a different UC&C instance/login 522 that might represent them individually or as a group, with a virtual—or real login to the UC&C tool 520. Here, a virtual login enables a UC&C presence via extra instance(s) 524 connected to the UC&C tool 520 without running a traditional UC&C client of the UC&C tool 520. Such extra instance(s) 524 can be optional and are illustrated as a dashed box in FIG. 5. The notes and variants of the other embodiments remain valid and applicable for this embodiment. While two participants (e.g., $P_1$ 551 and $P_2$ 552) are represented with an active device such as a user device and one participant is represented without an active device, this should not be considered as limiting. There can be an arbitrary number of active device users (e.g., minimum 2) and an arbitrary number of users without an active device (e.g., 0 or more), and an arbitrary number of audio devices that is a part of or connected to the system 500.

With the presence of additional participants who do not have an active device for themselves, the audio source detection block 505 can identify such a participant talking by either direct or indirect means. An example of a direct means of detection can be the use of a speech identification algorithm that can recognize the identity of the participant talking from the sensors 503 of the devices 502, e.g., using an audio signature of the voice of the participant. An example of an indirect means of detection is to use the inverse of the knowledge of the direct detection of participants who do have an active device 502. For example, the audio source detection block 505 may detect, via the speech detection unit 504, a participant talking with an active device by analysing, using a multimodal analysis, the video that is coming from the device 502 (e.g., from a laptop camera) together with the audio that is coming from the device 502 (e.g., from a laptop microphone) and determine, via the aggregator 506, that the participant in front of the device 502 is actually the participant who is talking. The audio source detection block 505 may detect all active devices 502 in the meeting space 550 to determine that the participant who is speaking has no associated device 502. For example, when a participant is detected to be talking but none of the active devices 502 indicates that the participant in front of the device 502 is talking, the audio source detection block 505 can determine that another participant is talking without an active device. While this example of an indirect detection may not provide identity of the participant who is talking (one can merely identify that a participant is talking who is not using an active device), this can be enough to enable the system 500 to route the proper audio signal to the proper UC&C instance. For example, the system 500 can send the audio of participants without an active device to a default UC&C instance or, alternatively, the system 500 can change the current signal routing in this case and make changes to the configuration of the audio system 515 when a participant is talking who has an active device.

The mapping block 512 can receive the output signal from the audio source detection block 505 regarding the status (active or not) of the detected source(s), and map, via mapping function [Src, Instance] 511, the detected source(s) to specific UC&C instances/logins connected to the UC&C instances/logins tool 520. In this embodiment, one participant, e.g., $P_3$ 553, who does not have an active device $D_x$ may not have a UC&C instance. The block 512 can determine what UC&C instance 522, 524 can be used for the audio source (participant 553 in this example), and where to send the audio signals to. As described above, in one variant of the embodiment, audio (e.g., speech) from a participant who is not in front of a device might be sent to UC&C instances/logins 522 associated with one of the existing devices $D_x$. In another variant, the audio might be sent to an extra UC&C instance 524 that, for example, represents the group rather than the individual (indicated with the dashed box at the end). In yet another variant, the audio might be ignored and not sent to a UC&C instance/login 522 or 524. In yet another variant, the audio system may not be altered when a participant is talking but not in front of a device. The block 512 can have additional inputs that enable configuration of this mapping, predefined or at runtime, so that the configuration of the audio system 515 can change during execution. The mapping function provided by the block 512 can facilitate diverse muting scenarios for instance, where a single participant in the room may be muted, the full meeting space 550 can be muted, or any case in between. The muting can be manual or automatic and can trigger enabling signal processing and/or routing in the configurable audio system 515 via the audio control functional block 510.

The audio control block 510 may take the input from a [Source, Instance] mapping block 512 and translate the input into configuration parameters towards the configurable audio system 515. For example, when the participant in front of a device $D_x$ is talking, the audio control block 510 can identify the signal source(s) for the audio source(s) $D_x$ at block 513, and configure the configurable audio system 515 at block 514 by sending signal(s) to the configurable audio system 515, e.g., sending the audio stream coming from a room microphone 560 to the UC&C instance running on device $D_x$ 502. While one room microphone is illustrated in the figures such as FIG. 4 or 5, it is to be understood that an arbitrary number of room microphone(s) or other audio device(s) can be utilized/integrated in the system. When a participant (without specific identity) is detected to be talking, the audio control block 510 may configure the audio system 515 to route the room microphone 560 to a fixed instance $D_y$ 522 or to an extra UC&C instance 524. Alternatively, the system 500 may be configured not to change the configurable audio system 515 when a participant is detected to be talking who has no active device $D_x$ unless the previous configuration was a configuration in which that participant would not be heard. For example, the audio system 515 may be previously auto-muted, and now needs to be unmuted when the audio source detection block 505 detects an active audio source in the meeting space 550.

In an embodiment, the configurable audio system 515, including room microphone controller 516 and audio rendering and routing unit 517, may have similar configurations and functions as the previous embodiments such as shown in FIG. 4. The room microphone signal from the room microphone 560 may be sent to various destinations (e.g., devices 502). The destination is configurable by the audio control functional block 510. Data- and control-streams can be established between the configurable audio system 515 and the UC&C instances 520 in order to facilitate the required audio processing and/or routing.

FIG. 6 illustrates a system 600 according to another embodiment, where a meeting space 650 is used without an active room microphone such as the room microphone 460 in FIG. 4 and the room microphone 560 in FIG. 5. In this case, the audio devices 616 are part of, connected to, or provided by the active devices 602. The audio devices 616 can be used to facilitate the hybrid meeting. In the meeting space 650, there are multiple participants/users with an active device and, optionally, users without an active device. The notes and variants of the other embodiments remain valid and applicable for this embodiment. For example, while the embodiment depicted in FIG. 6 exemplifies the use of audio devices 616 connected to or in an active device, the use of other audio device(s) (e.g., a room microphone or other devices) can be combined and implemented with this embodiment. While two participants 651 and 652 are represented with an active device and one participant 653 is represented without an active device, this should not be considered as limiting. There can be an arbitrary number of active device users (e.g., minimum 2) and an arbitrary number of users without an active device (e.g., 0 or more), and an arbitrary number of audio devices that is a part of or connected to the system 600.

One of the differences of the present embodiment depicted in FIG. 6 with the previous embodiments such as depicted in FIG. 4 or 5 is the lack of an available room audio device, e.g., a room microphone. The audio control 610 may need to identify what signal source/device 616 to be used for an audio source detected by audio source detection block 605, e.g., via speech detection units 604, and speech detection aggregator 606. The mapping block 612 can receive the output signal from the audio source detection block 605 regarding the status (active or not) of the detected source(s), and map, via mapping function [Src, Instance] 611, the detected source(s) to specific UC&C instances/logins connected to the UC&C instances/logins tool 620. The active devices 602 may have one or more audio devices connected, and the audio control 610 can determine, for a given audio source, which is the most applicable signal source that should be used. It is to be understood that the connected audio device(s) may not be limited to audio device(s) built-in to the corresponding active device, and may include any audio device/component connected to the active device, e.g., wired (USB, HDMI, DVI, etc.) or wirelessly (Bluetooth, Wi-Fi, WAN, LAN, IR, cellular, etc.). A connected audio device/component may include, for example, a built-in laptop microphone, a microphone in a wireless headset connected to a laptop, a speakerphone connected to a laptop using various connecting protocols such as Universal Serial Bus (USB), etc. An active device may include, for example, a tablet, a phone, a head-mounted device, a meeting room device, etc. A measure for applicability can be based on proximity to the audio capture device, consistency in user experience, quality of the anticipated quality of capturing the audio source through the given signal source, etc.

In an example embodiment, the audio source detection block 605 can receive sensor data from the device sensors 603 of the devices 602 and detect audio sources based on the received sensor data. The associated microphone 616 of that device $D_x$ 602 can be used as an audio signal device. For instance, when a participant is detected to be talking in front of his/her laptop, the audio control 610 can identify the signal source(s) for the audio source(s) Dx at block 613, and configure the configurable audio system 615 at block 614. In the embodiment of FIG. 6, the audio control 610 can decide to signal audio from the microphone 616 of device $D_x$ 602 and route the audio signal to the UC&C instance 622 that represents the same participant. Alternatively, the system 600 may use the audio signal from a different microphone that is more applicable due to, for example, quality requirements.

When a participant is talking who is not using an active device 602, the audio control 614 can decide what audio signal to use to represent this participant in its associated UC&C instance 622. In one case, a default signal source or device is selected for the participant to enable a consistent experience. In another case, the nearest signal source or device can be selected to facilitate better quality. Yet in another case, the existing audio system configuration can be maintained to use and the audio control 614 may not make changes when the participant is talking who does not have an active audio device.

In an embodiment, where the configurable audio system 615 has no room microphone available, the audio devices 616 that are made available by the configurable audio system 615 can be used to optimally deliver the most appropriate (e.g., processed and/or routed by audio rendering and routing unit 617) audio signals to each of the UC&C instances connected to the UC&C tool 620. As with other embodiments, this may involve automatically muting/unmuting device microphones 616, muting/unmuting device speakers, applying processing to audio signals to prevent/reduce echo, reverb or increase quality, apply processing to (de)multiplex audio signals, etc. As mentioned in previous embodiments, UC&C instances 622, 624 connected to the UC&C tool 620 may be available in the active devices 602 or through other means (e.g., virtual instances, instances hosted by other devices, etc.).

FIG. 7 illustrates a system 700 according to another embodiment where a meeting space 750 is used with one of the active devices being a room system 761 to which, among other things, the room audio 760 can be connected. The room system 761 may include a processor enabled device to also run a UC&C instance/login (e.g., one of the extra instances 724 as room instance) connected to UC&C tool

720. The notes and variants of the other embodiments remain valid and applicable for this embodiment. While three active devices or user devices (e.g., devices $D_1$, $D_2$ and $D_3$) and participants 751, 752, 753 are represented (2 user devices 702, one room device 761) and one participant 752 is represented without an active device, this should not be considered as limiting. There can be an arbitrary number of active devices (e.g., minimum 2), an arbitrary number of users without an active device (e.g., 0 or more), and an arbitrary number of audio devices that is a part of or connected to the system 700. The configurable audio system 715, including room microphone controller 716 and audio rendering and routing unit 717, may have similar configurations and functions as the previous embodiments such as 415/416/417, 515/516/517 shown in FIG. 4 or 5.

The embodiment depicted in FIG. 7 is different from the embodiment shown in FIG. 4 in that a room system 761 is available that has its own UC&C instance/login connected to the UC&C tool or platform 720. The room system 761 might also be connected to room peripherals such as the room audio 760, a room speaker, etc. The system 600 enables a hybrid system between room- and personal systems where, for example, the room peripherals are processed/routed towards the room UC&C instance (e.g., $I_2$ on $D_2$ in this example) for participants who are not represented by another active device (e.g., participant $P_2$ 752 in this example). When a participant (e.g., participant 751, 753 in this example) is talking who has an active device, at least a subset of the room peripherals can be processed/routed towards the associated active device (e.g., device $D_1$, $D_3$ in this example). By doing so, one can give people without an active device proper room presence and give people with an active device a more personal presence.

For example, when the audio source detection block 705, including speech detection units 704 and aggregator 706, receives data from device sensors 703, and identifies one active audio source (e.g., one of participants 751, 752, 753), [instance, source] mapping block 712 can map, at block 711, the identified active audio source to an instance connected to the UC&C tool or platform 720. In this example, participant 751 can be mapped to the instance 722 associated with device D1, participant 753 can be mapped to the instance 722 associated with device D1, and participant 752 can be mapped to the room instance 724 associated with the room system 761. The audio control block 710 can determine an audio signal source or device (e.g., room audio 760 in this example), and configure, at block 713, the audio system 715 to route an active audio signal from the room audio 760 towards the mapped instance.

Note that all the shown (functional) diagrams for the embodiments are not device mappings. As such, these diagrams do not restrict to which physical component a certain function is mapped. In addition, a single function might be mapped to multiple components, or multiple functions can be mapped to a single component. In addition, certain functions might be combined to facilitate the anticipated functionality.

FIGS. 8A and 8B illustrate, in a non-limiting manner, two different device or system configurations 805, 805' for an audio source detection block, e.g., 305 in FIG. 3, 405 in FIG. 4, 505 in FIG. 5, 605 in FIG. 6, and 705 in FIG. 7. As shown in the embodiments, each device 802, 802' (e.g., Dx such as D1, D2, D3 . . . ) may include a speech detection unit 804, 804' to receive data from the corresponding sensor(s) 803, 803'. It is to be understood that in various embodiments depicted in FIGS. 8A-B and other figures, a speech detection unit may receive data from sources other than the corresponding sensor(s), such as illustrated by the symbol " . . . " in the figures. While three devices Dx are illustrated in the figures such as FIG. 8A or 8B, it is to be understood that an arbitrary number of devices can be utilized/integrated in the system. The device(s) may include, for example, an audio device connected to or in an active device, other audio device(s) such as, e.g., a room microphone or other devices.

In the embodiment of FIG. 8A, the audio source detection block 805 uses a central device 810 to implement a central aggregator 806 to aggregate individual decisions, or to coordinate collaborative decisions made in the individual speech detection blocks 804. In an embodiment, the central device 810 may be a base unit (e.g., base unit 910 in FIGS. 9A-C) connected to room peripherals to facilitate connecting to the devices 802 in the room. It is to be understood that a base unit, a central device, or a room device in various embodiments described herein, such as depicted in FIGS. 8A and 9A-C and other figures, may be a separate device, or may have its functionality integrated in various devices such as, e.g., a camera device, a display, an all-in-one device, as downloadable or installed program or application, etc.

In the embodiment of FIG. 8B, the audio source detection block 805' does not use such a central device as in FIG. 8A but uses a distributed system for collaboration among the devices to get a consistent experience. The audio source detection block 805' uses multiple devices $D_x$ 802' each having aggregator 804' which communicate with each other to get an individual, optionally aggregated, result. For example, the devices 802' may exchange audio/video data or metadata to get a conclusion on who is speaking and what to do with the conclusion of analysis. While this is just an example, it illustrates that the functional diagrams in FIGS. 8A and 8B can be mapped in various ways to a physical system. For example, in an embodiment, the speech detection may be done centrally, in which sensor data from the devices may be sent to a base unit, instead to the respective speech detection units 804, 804', and the detection may be done completely on the base unit. While many blocks could be interpreted as a single central entity, this disclosure is not intending to be limited to such an interpretation.

FIGS. 9A-9C illustrate functional diagrams 900*a*, 900*b* and 900*c* of a device/system configuration which may implement a system for mediating an audio source for a meeting on a communications and collaboration platform. In an embodiment, the device/system configurations 900*a*-*c* may implement or map to the system 500 as depicted in FIG. 5. As shown in FIGS. 9A-C, participants 951, 952 each have an active device or user device 902 (e.g., user device $D_1$, $D_2$) in the meeting space 950 with room equipment (e.g., room microphone 960, room speaker 961, etc.). Optionally, there are participants 953 who do not have an active device or user device 902. This mapping represents, without restriction, one possible example or implementation of mapping functionality to devices. The notes and variants of the other embodiments remain valid and applicable for this embodiment. While two participants are represented with an active device or user device and one participant is represented without an active device, this should not be considered as limiting. There can be an arbitrary number of active device participants (e.g., minimum 2), an arbitrary number of participants without an active device (e.g., 0 or more), and an arbitrary number of audio devices that is a part of or connected to the system 900*a*.

As illustrated in FIG. 9A, when a participant $P_x$ (e.g., $P_1$ 951, $P_2$ 952) with an active device $D_x$ 902 is talking, the active device $D_x$ 902 can detect and generate, via the respective sensors 903 and speech detection units 904, information regarding whether this participant is talking. The sensors 903 may include, for example, one or more integrated, attached/connected cameras and microphones. For example, a connected audio/video device/component may include a built-in laptop microphone/camera, a microphone/camera in a wireless headset connected to a laptop, a speakerphone/camera connected to a laptop using various connecting protocols such as Universal Serial Bus (USB), etc. Additionally, the system could detect and generate information regarding whether a participant other than $P_x$ is talking, or even more specifically that $P_y$ is talking. The generated information may be routed to a central detection aggregation node 906 to determine whether one participant is talking or not. In this example, the central detection aggregation node 906 is used in the base unit or device 910.

It is to be understood that the base unit or device 910 can be an arbitrary device that can execute the functionality of the functional blocks 906, 916, 917 and has communication means towards the relevant components. An example base unit is described in U.S. Patent Pub. No. 2021/0191893 (to Renard and Defraef) entitled "Method and system for making functional devices available to participants of meetings" which is incorporated herein by reference.

The base unit 910 can wirelessly connect to the devices Dx to implement at least one of an instance detection module (e.g., 310 in FIG. 3) and an audio control module (e.g., 315 in FIG. 3). The base unit 910 also connects to room devices such as, e.g., room microphone 960, room speaker 961, to allow the devices Dx to access to the room devices. It is also to be understood that a base unit or device, in various embodiments described herein, such as depicted in FIGS. 8A and 9A-C and other figures, may be a separate device, may be a part of or connected to another device, or may be implemented as software or hardware or combination thereof and have its functionality integrated in various devices such as, e.g., a camera device, a display, an all-in-one device, as downloadable or installed program or application, etc.

The detection aggregation node 906 can create a consensus of one or more active sound sources (e.g., when one or more participants 951, 952, 953 are talking) and create a control signal towards the audio rendering and routing block 917. The audio rendering and routing block 917 can generate configuration parameters based on the received control signal to configure the room peripherals, such as the room speaker(s) and room microphone(s), to process and route active audio signal towards certain UC&C instances 922 connected to a UC&C tool or platform.

In one example, the base unit 910 maintains active connections with the UC&C instances $I_x$ 922 and renders relevant audio signals based on the signalled configuration parameters. For example, when participant $P_2$ 952 is detected to be talking, the microphone signal towards the UC&C instance $I_2$ 922 can be a copy of the signal from the room microphone 960, while the microphone signal towards the UC&C instance $I_1$ 922 can be a zero-signal, i.e., a signal that represents silence. As such, the rendering implicitly provides the routing. Alternatively, the signals towards a UC&C instance $I_x$ 922 can effectively be routed based on the configuration parameters. Audio signals can be sent to/from the relevant device 902 when the configuration parameters of the audio rendering and routing block 917 indicate such a case. These are just 2 non-limiting examples of how a configurable audio system can work in a centralized approach with a centralized detection aggregator.

When one of the participants $P_x$ 951, 952 is talking who have an active device $D_x$ 902, the system 900*a* can determine the room peripherals 960, 961 to be used by the relevant UC&C client $I_x$ 922. For example, the room microphone signal can be sent to the active device of the participant who is speaking and/or the room speaker can receive the signal from the relevant $I_x/D_x$. In some cases, a room microphone 960 and a room speaker 961 can be switched on at the same time for echo cancellation. It is to be understood that it may not be required to switch on the room microphone 960 and the room speaker 961 at the same time, and multiple room peripherals can be separately selected.

When participant $P_3$ 953 is talking who does not have an active device $D_x$ 902, the system 900*a* can use the speech/audio detection capabilities of other sources than using the active devices 902 of other participants 951, 952 (in this example, $P_1$ and $P_2$). For example, when device $D_1$ detects that a participant other than participant $P_1$ 951 is talking, and device $D_2$ detects that a participant other than participant $P_2$ 952 is talking, and there are only 2 active devices 902, the system 900*a* can determine that a participant without an active device (in this case, participant 953) is talking. The detection aggregation 906 might send signal to the audio rendering and routing 917 that the room peripheral signal(s) need to be sent to a dedicated instance $I_x$ 922 that is responsible for representing participants 951, 952. In other words, one of the active devices 902 in the meeting space 950 can provide a 'host' role to participant 953 without an active device. Alternatively, the detection aggregation 906 might signal to the audio rendering and routing 917 that the nearest active device 902 needs to handle the room peripheral signal(s). Yet alternatively, the detection aggregation 906 might not change the current audio rendering and routing 917 when such a user speaks. In another example, when the system determines that it is participant 953 who is talking without an active device, the system can send the related audio signal(s) to certain UC&C instance(s), which may be an existing one or a newly created/activated one. The system can determine who is effectively talking based on various data such as, for example, voice signatures, exclusion (e.g., it is known that there are 3 people and 2 of them have active devices), external analysis (e.g., by analysing a room camera and correlating with the available audio signals), etc. Also here, these are mere implementation examples and should not be considered limiting. A variant to this embodiment is to detect audio activity on each of the devices $D_x$ 902 without relating the detection to the participant using the device, and to assign the room peripheral(s) 960, 961 to the device 902 with the most relevant activity features. For example, the system 900*a* can select the device 902 with the strongest audio signal or the audio signal with the least amount of reverb.

As illustrated in the embodiment of FIG. 9B, one or more peripheral devices 920 (e.g., D11 or D22) are used to adapt to a configurable audio system to communicate signals to/from the instance(s) 922 of the device(s) 902. The device(s) 902 may be a user device or a processing device. The peripheral device(s) 920 may each have a connector adapted to couple to the device(s) 902 in a wired or wireless manner. The peripheral device(s) 920 may be adapted to receive sensing data from the device(s) 902 and to process and/or route, e.g., at block 926, the sensing data to the base unit 910 or a device that is adapted to execute functions similar to the base unit 910. The peripheral device(s) 920 may also be adapted to route audio signals, e.g., at block 924, to/from the instance(s) 922. An example peripheral device is described in U.S. Patent Pub. No. 2021/0336859 entitled "Electronic tool and methods for meetings" which is incorporated herein by reference.

In one example embodiment, the peripheral device(s) 920 may be a processor-enabled device that includes a memory that stores software to be run on the device 902 (i.e., processing device). The virtual audio device block 924 can be implemented by software, hardware or a combination thereof to route audio signals to/from the instance(s) 922. For example, the virtual audio device block 924 may provide the audio signals to/from a configurable audio system from/to the instance(s) 922. The virtual audio device block 924 may be exposed to (or present) the instance(s) 922 as a generic audio device. That is, the peripheral device(s) 920 may present, via the virtual audio device block 924, mediated audio signals to a communications and collaboration platform.

The user device 902 and the peripheral device 920 can process/forward signals (which may be processed) to facilitate an audio source detection. Blocks 904, 926 and 906 of the user device 902 and the peripheral device 920 can cooperate with each other to conduct the audio source detection. For example, the route/process signals block 926 can be implemented by software, hardware or a combination thereof to pass through sensor data of the sensors 903 from the device 902 to the peripheral device(s) 920, via blocks 904 and 926. The device 902 may implement software, hardware or a combination thereof to route/process the sensor data before the sensor data is sent to the peripheral device 920. The route/process signals block 926 of the peripheral device 920 can be implemented by software to route/process the sensor data before sending the sensor data to the base unit 910 or a device similar to the base unit 910.

In another example embodiment, the peripheral device 920 may use generic communication protocols and/or drivers for communication with the device 902, and to implement the virtual audio device block 924 and the route/process signals block 926. In an embodiment, instead of storing software to be run on the device 902, the peripheral device 920 may require no software installation and implementation on the device 902.

It is to be understood that the allocation of functionality between the device 902, the peripheral device 920 (e.g., D11 or D22) and the base unit 910 should not be seen as limiting. The implementation of routing/processing signals in one or more of the peripheral device 920, the base unit 910 and the device 902 may be dependent on desired applications. The processing of various signals can be implemented in the processing device 902, the peripheral device 920 and/or the base unit 910. As such, the signals that are sent between these devices are also implementation dependent.

As illustrated in the embodiment of FIG. 9C, the peripheral device 920 (e.g., D11 or D22) may have its own sensing devices 923 such as, e.g., a microphone or a camera, and may not require access to a sensing device of the device 902 (e.g., the sensing device 903 in FIG. 9A or 9B). It is to be understood that the peripheral device 920 in the embodiments of FIGS. 9B and 9C may have substantially the same functionality except that the In an embodiment, the system/device configuration 900*c* can facilitate a peripheral device (e.g., 920) that does not require software to be run on the processing device 902.

In the embodiments depicted in FIGS. 9B-9C, the virtual audio device 924 may present, for example, a microphone, to the device 902 by means of a generic communications protocol such as, e.g., USB. The presented microphone signal can exhibit desired properties. For example, when participant/user 951 associated with the device D1 talks, the signal coming from the virtual audio device 924 exposed by a first connected peripheral audio device can be, for example, the signal from the room microphone 960. The signal coming from the virtual audio device 924 exposed by a second connected peripheral audio device (e.g., an audio device connected to D2) can in that case be silence when the user associated with the processing device D2 is silent. When the participant/user 952 associated with the device D2 starts talking, the signal coming from the virtual audio device 924 exposed by a second connected peripheral (peripheral connected to D2) can now be, for example, the signal from the room microphone 960. It is to be understood that the routing/processing of signals in the peripheral device 920, the base unit 910, and the processing device 902 is implementation dependent. In various example embodiments, the peripheral device 920 may, for example, route the sensing data to the base unit 910 which may do the necessary processing for audio source detection. The peripheral device 920 may, for example, pre-process the sensing data and send the results to the base unit 910 for further processing. The peripheral device 920 may, for example, detect the audio source and send the conclusion to the base unit 910 for audio rendering and routing. One device 902 that use a peripheral device 920 can be combined with another device 902 that enables functionality without a peripheral device 920 (e.g., via software) without limitation.

In the embodiments depicted in FIGS. 9B and 9C, it is to be understood that the exact distribution of functionality, e.g., what is to be processed/generated/forwarded by the functional blocks of the user device(s) 902 and the peripheral device(s) 920, is implementation dependent. It is also to be understood that the functional blocks are split for clarity, but should not be considered restrictive. That is, there might be an implementation where all functionality of the peripheral device(s) 920 is exposed or implemented through a generic audio device and the user device(s) 902 may not require specific software to be run. In another embodiment, proprietary software, hardware, or a combination thereof might be used to implement the functionality in a non-generic manner.

FIG. 10 illustrates a functional diagram of a device/system configuration 1000 which may implement a system for mediating an audio source for a meeting on a communications and collaboration platform. In an embodiment, the device/system configuration 1000 may implement or map to the system 600 as depicted in FIG. 6. As shown in FIG. 10, participants 1051, 1052, 1053 each have an active device 1002 in the meeting space 1050. Optionally, there are one or more participants 1054 who do not have an active device. This mapping represents, without restriction, one possible example of mapping functionality to devices, and represents one possible implementation. The notes and variants of the other embodiments remain valid and applicable for this embodiment. While three participants are represented with an active device and one participant is represented without an active device, this should not be considered as limiting. There can be an arbitrary number of active device participants (minimum 2) and an arbitrary number of participants without an active device (0 or more), and an arbitrary number of audio devices that is a part of or connected to the system 1000.

In the embodiment depicted in FIG. 10, there is no centrally coordinating device. Instead, a distributed approach is provided where all devices 1002 collaborate to achieve the desired result. Each device 1002 includes device sensors 1003 (e.g., video or audio components such as cameras, microphones, speakers, etc.), speech detection unit 1004, detection aggregation unit 1006, audio rendering and routing unit 1017, and UC&C instance 1022 associated with the respective participants 1051, 1052, 1053. Take device $D_1$ associated with participant 1051 for instance. Device $D_1$ can detect, via speech detection unit 1004 and detection aggregator 1006, whether participant 1051 using the device is speaking. Additionally, device $D_1$ can detect whether a participant is speaking who is not the participant 1051 associated the device $D_1$. The detection aggregator 1006 can coordinate this detection with the detections of the other devices 1002 to create a result that is signalled to the audio rendering & routing block 1017. For example, when the conclusion is that the relevant UC&C instance/login 1022 can have active audio (e.g., to enable the microphone and/or speaker 1003 of device $D_1$), this audio rendering & routing unit 1017 can configure the audio system to route the active audio signal to the corresponding UC&C instance 1022.

According to the system 1000 depicted in FIG. 10, devices 1002 collaborate to automatically configure the audio system in order to create a desirable experience. In one example, one active microphone signal from one device 1002 is selected as input to one of the UC&C instances/logins 1022 at a given time. The active microphone signal can be the one that is most applicable, typically from the participant that is near the device $D_x$ 1002. The system 1000 can provide the participant an experience of automatically muting/unmuting depending on who is talking in front of their respective devices 1002. In addition, the system 1000 can mediate audio source for participants who do not have an active device by detecting, for example, the nearest active device 1002 (e.g., laptop) to that participant and sending routing the proper audio signals to that active device. Descriptions for the previous embodiment in FIGS. 9A-C with respect to rendering versus routing may also be applicable for this embodiment (and all other embodiments described herein). The system 1000 can determine to mute, via a rendered signal, audio devices to route the signal when it is non-silent, or to use control data to (un)mute the UC&C instances 1022 regardless of the routed audio signal, etc.

The system 1000 may use the speaker and microphone 1003 of different devices 1002 in different manners. For example, the system 1000 may decide to always use all speakers 1003 on the devices 1002 and only switch between microphones 1003 of different devices 1002. Alternatively, one might switch speakers 1003 along with microphones 1003 depending on detected audio sources. Other alternatives are possible, and this solution is not restricted to the mentioned examples. This remark holds for all other embodiments.

A variant to the embodiment depicted in FIG. 10 is to detect audio activity on each of the devices Dx 1002 (without relating it to the participant associated with the device) and to assign room peripheral(s) (e.g., components 960 and 961 in FIG. 9A) to the device 1002 with the most relevant activity features. For example, the system may select the device 1002 with the strongest audio signal or the audio signal with the least amount of reverb.

In one example embodiment, a peripheral device (e.g., the peripheral device 920 of FIG. 9B or 9C) can be used that is adapted to communicate signals from a configurable audio system towards instance 1022 to the user device or processing device 1002. The peripheral device has a connector adapted to couple to the processing device 1002 in a wired or wireless manner. The peripheral device may be adapted to receive sensing data from the user device 1002 and may be adapted to process/route the sensing data to other devices 1002. In an embodiment, the peripheral device may be processor-enabled device that includes a memory that stores software to be run on the processing device 1002. The software may be implemented to pass through sensor data from the processing device 1002 to the peripheral device. The software may be implemented to route/process the sensor data before it is sent to the peripheral device. The peripheral device may route/process the sensor data before it is sent to other device(s) 1002. In another embodiment, the peripheral device may require zero software installation and use generic communication protocols and/or drivers for communication with the processing device 1002.

In one example embodiment, the peripheral device used for the system 1000 may have its own sensing devices, such as a microphone or camera and may not require access to the sensing devices 1003 on the processing device 1002. This configuration, similar to the configuration illustrated in FIG. 9C, can facilitate a peripheral device that does not require software to be run on the processing device. Instead, a virtual audio device can present, for example, a microphone, to the processing device 1002 by means of a generic communications protocol such as, e.g., USB. The presented microphone signal can exhibit desired properties. For example, when user/participant 1051 associated with the processing device D1 talks, the signal coming from the virtual device exposed by a first connected peripheral audio device is, for example, the signal from a room microphone. The signal coming from the virtual device exposed by a second connected peripheral audio device (e.g., an audio device connected to D2) can in that case be silence when the user 1052 associated with the processing device D2 is silent. If the user 1052 associated with the processing device D2 starts talking, the signal coming from the virtual device exposed by a second connected peripheral (peripheral connected to D2) can now be, for example, the signal from the room microphone. It is to be understood that devices 1002 that use a peripheral device can be combined with devices 1002 that enable functionality without a peripheral device (e.g., via software) without limitation.

FIG. 11 illustrates a functional diagram of a device/system configuration 1100, according to an embodiment. In an embodiment, the device/system configuration 1100 may implement or map to the system 600 as depicted in FIG. 6. As shown in FIG. 11, participants 1051, 1052, 1053 each have an active device 1002 in the meeting space 1050. Optionally, there are one or more participants 1054 who do not have an active device. This mapping represents, without restriction, one possible example of mapping functionality to devices, and represents one possible implementation. The notes and variants of the other embodiments remain valid and applicable for this embodiment. While three participants are represented with an active device and one participant is represented without an active device, this should not be considered as limiting. There can be an arbitrary number of active device participants (minimum 2) and an arbitrary number of participants without an active device (0 or more), and an arbitrary number of audio devices that is a part of or connected to the system 1100.

In the embodiment depicted in FIG. 11, there is no centrally coordinating device. Instead, a distributed approach is provided where all devices 1002 collaborate to achieve the desired result. Each device 1002 includes device sensors 1003 (e.g., video or audio components such as cameras, microphones, speakers, etc.), speech detection unit 1004, detection aggregation unit 1006, audio rendering and routing unit 1017, and UC&C instance 1022 associated with the respective participants 1051, 1052, 1053. Take device $D_1$ associated with participant 1051 for instance. Device $D_1$ can detect, via speech detection unit 1004 and detection aggregator 1006, whether participant 1051 using the device is speaking. Additionally, device $D_1$ can detect whether a participant is speaking who is not the participant 1051 associated the device $D_1$. The detection aggregator 1006 can coordinate this detection with the detections of the other devices 1002 to create a result that is signalled to the audio rendering & routing block 1017.

According to the system 1100 depicted in FIG. 11, devices 1002 collaborate to automatically configure the audio system in order to create a desirable experience. As shown in FIG. 11, the device sensors 1003 of device $D_3$ include peripherals 1161, 1162 (e.g., microphone and speaker) which are shared among devices 1002. It is to be understood that peripherals 1161, 1162 can be integrated in the active device, or connected to the active device by other means (e.g., a USB speakerphone connected to the active device). In one example embodiment, the system 1100 may decide to always use the speaker 1162 and microphone 1161 of device $D_3$ which are shared among devices 1002.

It is to be understood that the embodiment depicted in FIG. 11 can be combined with the previous embodiments (e.g., the embodiments depicted in FIGS. 9A-C) using room peripherals with the embodiment of FIG. 10 using device-centric peripherals (e.g., components 1003). For example, the system 1100 may select the audio peripherals 1003 of one or more of the devices 1002 as the reference peripherals and route the signals to/from these selected audio peripherals 1003 based on the detected audio sources. Practically, the system can for instance select one device 1002 (e.g., a laptop) to be the reference device and use its microphone and/or speaker as the reference to be used in all active devices. The system may allow the reference signals to be exchanged between the laptops, either statically or dynamically. For example, the devices 1002 may always send around the signals, or only on-demand, or a mix, to facilitate their use in the relevant UC&C instances/logins 1022 based on the detected audio sources. Such an embodiment may be considered as a hybrid mode between the previous embodiments where a distributed approach is using shared devices to communicate to the UC&C instances/logins.

One feature that may be relevant for all embodiments described herein is related to the device federation of all involved devices. When devices are brought into a meeting space and removed from the meeting space, or are enabled/disabled within the meeting space, the system configuration can require changes in order to optimize the system or to keep the system working.

FIG. 12 illustrates an embodiment in which by monitoring changes in the device federation at monitor block 1205, a device federation module of the system can identify whether the device view needs to be updated. For example, when a user or participant sends a request to the system to connect to a meeting space, the monitor block 1205 can detect, via the device federation module, this change and signal an update to the device view 1210. The device view 1210 has a notion of the devices that are involved within the system and thus needs to be updated when devices are added or removed. Once the device view 1210 is updated, the system configuration 1215 can be updated if required. For example, when another active device is added, the system may create, via the device federation module, a connection between the UC&C instance/login on that new active device and an audio rendering & routing block of the system. In a distributed approach, the system can allow the other devices to be aware of a new device that collaborates. Similar with devices that are removed or that have changing capabilities (e.g. a device that used to be able to do certain processing might not be able to do that anymore). In such cases, the system can be (re)configured to facilitate these changes.

Device federation can be implemented by the system in various way, with varying levels of automation. In one case, a participant might need to do a manual action to connect to the meeting. In another case, the participant might receive a trigger from the system that enables a one-click connect to the meeting space system. Yet in another case, the system can automatically connect the participant to the meeting based on detected presence, for example, using ultrasound, machine-readable code (e.g., QR code), or similar identification systems. In one example embodiment, an application or other downloadable program may be executed by a processor-enabled device such as, for example, a base unit or a room device, to emit ultrasound signal and detect a participant's presence in the meeting space based on the received ultrasound signal and automatically log the participant into the meeting. In one example embodiment, an application or other downloadable program may be executed by a device (e.g., a participant's portable computing device) to scan a machine-readable code (e.g., QR code) to automatically log into the meeting.

The device view can be built centrally or distributed dependent on various implementations. The system configuration can be updated centrally or distributed, dependent on the implementation.

In some cases, the device federation can change during operation. The device view and system configuration can be adapted to facilitate these changes and ensure an optimal system. In some cases, certain changes to the device federation might not impact the system, or the system may determine to not update directly in order to, for example, group updates and do a single device view and/or system configuration update.

FIG. 13 illustrates an example processing flow 1300 for mediating an audio source for a hybrid meeting on a communications and collaboration platform, according to at least another example embodiment described herein. It is to be understood that the processing flow 1300 disclosed herein can be conducted by one or more systems (e.g., the system 300 of FIG. 1, the system 300 of FIG. 1, the system 300 of FIG. 1, the system 400 of FIG. 4, the system 500 of FIG. 5, the system 600 of FIG. 6, the system 700 of FIG. 7, and/or any other suitable system or device), unless otherwise specified.

It is also to be understood that the processing flow 1300 can include one or more operations, actions, or functions as illustrated by one or more of blocks 1310, 1320, 1330, 1340, and 1350. These various operations, functions, or actions may, for example, correspond to software, program code, or program instructions executable by one or more processors that cause the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 1300 may begin at block 1310.

At block 1310, the system identifies at least one active audio source in the physical meeting space. The system may include an audio source detection module to identify the active audio source in the physical meeting space. The audio source detection module can also determine, based on the received audio data, video data, or metadata, an active audio device for the active audio source. The audio source detection module may include a detection aggregator to aggregate the received audio data, video data, or metadata into a consensus to determine the active audio device. The processing may proceed from block 1310 to block 1320.

For example, in the embodiment depicted in FIG. 4, the audio source detection block 405 receives audio data, video data, or metadata from the devices 402 to identify the active audio source, e.g., participant 451 or 452 who is talking in front of the respective devices 402. The audio source detection block 405 can determine device $D_1$ or $D_2$ to be the active audio device, e.g., when the respective participant $P_1$ or $P_2$ is talking. The detection aggregator 406 can aggregate the results from each speech detection unit 404 into the consensus.

At block 1320, the system maps the active audio source to one or more instances connected to the communications and collaboration platform to determine a mapped instance. The system may include an instance detection module to determine the mapped instance. When the active audio source is determined to be associated with the active audio device, the instance detection module can designate one of the instances associated the active audio device as the mapped instance. When the active audio source is determined to be not associated with the active audio device, the instance detection module can designate one of the instances associated with one of the devices in the physical meeting space as the mapped instance. The processing may proceed from block 1320 to block 1330.

For example, in the embodiment depicted in FIG. 5, the mapping block 512 can determine the mapped instance for the active audio source, e.g., participants 551, 552, 553. When it is determined that participant 551 or 552 is talking in front of their respective active devices 502, the mapping block 512 can designate the instances 522 associated with their respective devices 502 as the mapped instance for participant 551 or 552. When it is determined that participant 553 is talking without an active device, the mapping block 512 may designate one of the instances 522, 524 as the mapped instance for participant 553.

At block 1330, the system determines at least one audio signal device from a plurality of devices in the physical meeting space for the active audio source. In some cases, room peripheral(s) such as, for example, the room microphones 460, 560, 760 in FIGS. 4, 5 and 7, can be designated as the audio signal device to capture audio from the active audio source, e.g., one of the participants in the meeting space when they are talking. In some cases, audio peripherals of the respective active devices such as, for example, the device microphones 616 of the devices 602 in FIG. 6, can be determined as the audio signal device to capture audio from the participant who is talking. The system may include an audio control module to determine the audio signal device by comparing multiple audio signals from the respective devices. For example, in the embodiment depicted in FIG. 6, the audio control block 614 may determine which device microphone 616 as the audio signal device to capture audio from the participant 653 without an active device by comparing the respective audio signals from the device microphones 616. The processing may proceed from block 1330 to block 1340.

At block 1340, the system (e.g., an audio control block of the system) configures an audio system to process an active audio signal from the determined audio signal device via the mapped instance. For example, in the embodiment depicted in FIG. 4, the audio control block 410 can configure the audio system 415 to manipulate the active audio signal (e.g., speech from participant 451) from the audio signal device (e.g., the room microphone 460) via the mapped instance (e.g., the UC&C instance $I_1$ associated with participant 451). In various example embodiments, an audio control block may perform various signal processing functions on an audio signal before routing the audio signal to a mapped instance. For example, the audio control block may configure an audio system to split an audio signal including multiple participants' voices into different signals. The audio control block may configure the audio system to process the audio signal to improve its audio quality (e.g., to prevent an echo/distortion). The audio control block may configure the audio system to generate a new signal based on the detected audio signal. It is to be understood that the audio control block can configure the audio system with various types of processing, routing, and the combinations thereof to achieve the requirements of the specific implementation. The processing may proceed from block 1340 to block 1350.

At block 1350, the system can determine a new mapped instance corresponding to a new active audio source upon identifying a new active audio source. In an embodiment, the system can process the corresponding new active audio signal and switches the routing via the new mapped instance. For example, in the embodiment depicted in FIG. 4, when the audio source detection block 405 detects that participant 451 stops talking and participant 452 starts to talk, the mapping block 412 can determine the new mapped instance (e.g., the UC&C instance 12 associated with participant 452), and the audio control block 410 can configure the audio system 415 to switch the routing from the previous mapped instance (e.g., the UC&C instance $I_1$ associated with participant 451) to the present mapped instance (e.g., the UC&C instance 12 associated with participant 452). In some cases, upon identifying a new active audio source, the routing of the active audio signal from the audio signal device can be maintained without switching.

FIG. 14 is a schematic structural diagram of an example computer system 1400 applicable to implementing an electronic device (for example, the room device 810 in FIG. 8A, the base unit 910 in FIGS. 9A-C, the devices 402, 502, 602, 702, 802, 802', 902, 1002, 1102 in FIGS. 4, 5, 6, 7, 8A, 8B, 9, 10, 11), arranged in accordance with at least some embodiments described herein. It is to be understood that the computer system shown in FIG. 14 is provided for illustration only instead of limiting the functions and applications of the embodiments described herein.

As depicted, the computer system 1400 may include a central processing unit (CPU) 1405. The CPU 1405 may perform various operations and processing based on programs stored in a read-only memory (ROM) 1410 or programs loaded from a storage device 1440 to a random-access memory (RAM) 1415. The RAM 1415 may also store various data and programs required for operations of the system 1400. The CPU 1405, the ROM 1410, and the RAM 1415 may be connected to each other via a bus 1420. An input/output (I/O) interface 1425 may also be connected to the bus 1420.

The components connected to the I/O interface 1425 may further include an input device 1430 including a keyboard, a mouse, a digital pen, a drawing pad, or the like; an output device 1435 including a display such as a liquid crystal display (LCD), a speaker, or the like; a storage device 1440 including a hard disk or the like; and a communication device 1445 including a network interface card such as a LAN card, a modem, or the like. The communication device 1445 may perform communication processing via a network such as the Internet, a WAN, a LAN, a LIN, a cloud, etc. In an embodiment, a driver 1450 may also be connected to the I/O interface 1425. A removable medium 1455 such as a magnetic disk, an optical disk, a magneto-optical disk, a semiconductor memory, or the like may be mounted on the driver 1450 as desired, such that a computer program read from the removable medium 1455 may be installed in the storage device 540.

It is to be understood that the processes described with reference to the flowchart of FIG. 13 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 1445, and/or may be installed from the removable medium 1455. The computer program, when being executed by the central processing unit (CPU) 1405, can implement the above functions specified in the method in the embodiments disclosed herein.

It is to be understood that the disclosed and other solutions, examples, embodiments, modules, events, functions, and the functional operations described in this document may be implemented in digital electronic circuitry, or in computer software, firmware, or hardware, including the structures disclosed in this document and their structural equivalents, or in combinations of one or more of them. The disclosed and other embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Additionally, while the above has been discussed with respect to methods and systems, it is appreciated that the methods may be stored on non-transitory computer-readable medium having computer-readable instructions, which when executed by a processor, performs the above steps of operation.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

Aspects:

It is appreciated that any one of aspects can be combined with each other.

Aspect 1. A system for mediating an audio source for a meeting on a communications and collaboration platform, the system comprising:

- an audio source detection module configured to identify at least one active audio source;
- an instance detection module configured to map the at least one active audio source to one or more instances connected to the communications and collaboration platform to determine a mapped instance; and an audio control module configured to:

determine at least one audio signal device from a plurality of devices to capture audio from the active audio source; and configure an audio system to manipulate an active audio signal from the audio signal device via the mapped instance.

Aspect 2. The system of Aspect 1, wherein the audio source detection module is configured to receive at least one of audio data, video data, or metadata from the plurality of devices.

Aspect 3. The system of Aspect 2, wherein the audio source detection module is configured to determine, based on the received audio data, video data, or metadata, an active audio device from the plurality of devices for the active audio source.

Aspect 4. The system of Aspect 2 or 3, wherein the audio source detection module comprises a detection aggregator to aggregate the received audio data, video data, or metadata into a consensus to determine the active audio source.

Aspect 5. The system of Aspect 4, wherein the detection aggregator is a centralized detection aggregator hosted by a base unit of the devices.

Aspect 6. The system of Aspect 4 or 5, wherein at least some of the plurality of devices form a distributed network, and the detection aggregator is hosted by the distributed network.

Aspect 7. The system of any one of Aspects 2-6, wherein the instance detection module is further configured to determine whether the active audio source is associated with the active audio device.

Aspect 8. The system of Aspect 7, wherein when the active audio source is associated with active audio device, the instance detection module is further configured to designate one of the instances associated the active audio device as the mapped instance, and when the active audio source is not associated with the active audio device, the instance detection module is further configured to designate one of the instances as the mapped instance.

Aspect 9. The system of any one of Aspects 1-8, further comprising a device federation module configured to detect a presence of one of the plurality of devices, and automatically connect the device to the communications and collaboration platform.

Aspect 10. The system of any one of Aspects 1-9, wherein the audio control module is configured to compare a plurality of audio signals from at least some of the devices to determine the audio signal source.

Aspect 11. The system of any one of Aspects 1-10, wherein the audio signal source comprises one or more room audio peripherals.

Aspect 12. The system of any one of Aspects 1-11, wherein the audio signal source comprises an audio device connected to a portable computing device.

Aspect 13. The system of any one of Aspects 1-12, wherein the audio control module is to configure the audio system to manipulate one or more audio signals between the instances and the plurality of devices.

Aspect 14. The system of Aspect 13, wherein the audio signals are manipulated based on the active audio signal and are different from the active audio signal.

Aspect 15. The system of any one of Aspects 1-14, wherein the audio control module is to configure the audio system to mute the plurality of devices except for the audio signal source.

Aspect 16. The system of any one of Aspects 1-15, wherein the audio control module is to configure the audio system to dynamically route an audio signal from/to one of the instances.

Aspect 17. The system of Aspect 16, wherein the audio control module is to configure the audio system to re-route the audio signal from the mapped instance associated with a room speaker based on an echo cancellation logic.

Aspect 18. The system of any one of Aspects 1-17, further comprising a base unit wirelessly connecting to a plurality of processing devices to implement at least one of the instance detection module and the audio control module.

Aspect 19. The system of Aspect 18, further comprising one or more room devices connected to the base unit which allows the plurality of processing devices to access to the room devices.

Aspect 20. The system of any one of Aspects 1-19, wherein the audio control module is to configure the audio system to manipulate the active audio signal to adapt to the active audio source.

Aspect 21. The system of Aspect 20, wherein the audio control module is to configure the audio system to filter the active audio signal to obtain a specific voice signal of a participant.

Aspect 22. The system of any one of Aspects 1-21, wherein the mapped instance of the communications and collaboration platform is associated with a desktop device.

Aspect 23. The system of any one of Aspects 1-22, wherein the mapped instance of the communications and collaboration platform is associated with a portable computing device.

Aspect 24. The system of any one of Aspects 1-23, wherein the instance detection module is configured to map the active audio source to one or more instances related to a source or sink of audio data.

Aspect 25. A method for mediating an audio source for a meeting on a communications and collaboration platform for a plurality of participants, the method comprising:

identifying at least one active audio source;

mapping the active audio source to one or more instances connected to the communications and collaboration platform to determine a mapped instance;

determining at least one audio signal source from a plurality of devices for the active audio source; and configuring an audio system to manipulate an active audio signal from the audio signal source via the mapped instance.

Aspect 26. The method of Aspect 25, wherein identifying the active audio source further comprises receiving at least one of audio data, video data, or metadata from the plurality of devices.

Aspect 27. The method of Aspect 26, further comprising determining, based on the received audio data, video data, or metadata, an active audio device from the plurality of devices for the active audio source.

Aspect 28. The method of Aspect 27, further comprising aggregating, via a detection aggregator, the received audio data, video data, or metadata into a consensus to determine the active audio device.

Aspect 29. The method of Aspect 27 or 28, wherein mapping the active audio source further comprises determining whether the active audio source is associated with the active audio device.

Aspect 30. The method of Aspect 29, wherein when the active audio source is associated with the active audio device, designating one of the instances associated with the active audio device as the mapped instance, and when the active audio source is not associated with the active audio device, designating one of the instances as the mapped instance.

Aspect 31. The method of any one of Aspects 25-30, further comprising upon identifying a second active audio source, and upon identifying a second active audio source, determining a second mapped instance, and maintaining a routing of the active audio signal from the audio signal device.

Aspect 32. The method of any one of Aspects 25-31, further comprising detecting a presence of one of the plurality of devices, and automatically connecting the device to the communications and collaboration platform.

Aspect 33. The method of any one of Aspects 25-32, further comprising comparing a plurality of audio signals from at least some of the devices to determine the audio signal source.

Aspect 34. The method of any one of Aspects 25-33, wherein the audio signal source comprises one or more room audio peripherals.

Aspect 35. The method of any one of Aspects 25-34, further comprising configuring the audio system to manipulate the active audio signal to adapt to the active audio source.

Aspect 36. The method of any one of Aspects 25-35, further comprising configuring the audio system to mute the plurality of devices except for the audio signal source.

Aspect 37. The method of any one of Aspects 25-36, further comprising identifying a second active audio source, mapping the identified second active audio source to at least one of the instances to determine a second mapped instance.

Aspect 38. The method of Aspect 37, further comprising switching a highlighting of the mapped instance on a user interface of the communications and collaboration platform to the second mapped instance.

Aspect 39. The method of any one of Aspects 25-38, further comprising monitoring a change of the plurality of devices connected to the platform, updating a device view of the meeting according to the change, and updating a configuration of the audio system according to the change.

Aspect 40. The method of any one of Aspects 25-39, further comprising creating or activating an instance for the active audio source when the active audio source is not associated with one of the instances.

Aspect 41. The method of Aspects 40, wherein the instance is created for a participant who is speaking.

Aspect 42. The method of Aspects 41, further comprising manipulating the active audio signal to ensure that only the participant's voice is sent to the mapped instance.

Aspect 43. The method of any one of Aspects 25-42, further comprising dynamically routing an audio signal from the mapped instance.

Aspect 44. The method of any one of Aspects 25-43, wherein the manipulating of the active audio signal further comprises re-routing or re-configuring the active audio signal from the mapped instance.

Aspect 45. The method of any one of Aspects 25-44, wherein the manipulating of the active audio signal further comprises generating audio signals to emulate the active audio signal.

Aspect 46. The method of Aspect 45, wherein the manipulating of the active audio signal further comprises inserting a silence signal when no active audio signal is to be routed.

Aspect 47. The method of any one of Aspects 25-46, further comprising configuring the audio system to manipulate an audio signal routed between the instances and the plurality of devices, wherein the audio signal is manipulated based on the active audio signal.

Aspect 48. The method of Aspect 47, further comprising configuring the audio system to route the audio signal from/to one of the instances.

Aspect 49. A system for mediating an audio source for a meeting on a communications and collaboration platform, the system comprising:

- an audio source detection module configured to identify at least one active audio source;
- an instance detection module configured to map the at least one active audio source to one or more instances connected to the communications and collaboration platform to determine a mapped instance; and
- an audio control module configured to:
- determine at least one audio signal source from a plurality of devices for the active audio source; and
- configure an audio system to manipulate an active audio signal from the audio signal source via the mapped instance.

Aspect 50. A method for mediating an audio source for a meeting on a communications and collaboration platform, the method comprising:

- identifying at least one active audio source;
- mapping the active audio source to one or more instances connected to the communications and collaboration platform to determine a mapped instance;
- determining at least one audio signal source from a plurality of devices for the active audio source; and
- configuring an audio system to manipulate an active audio signal from the audio signal source via the mapped instance.

Aspect 51. A system for mediating an audio source for a meeting on a communications and collaboration platform, the system comprising:

- an audio source detection module configured to identify at least one active audio source;
- an instance detection module configured to map the at least one active audio source to one or more instances connected to the communications and collaboration platform to determine a mapped instance; and
- an audio control module configured to:
- determine at least one audio signal device from a plurality of devices to capture audio from the active audio source; and
- configure an audio system to manipulate an active audio signal from the audio signal device via the mapped instance,
- wherein the system further comprises one or more user devices and one or more peripheral devices coupled to the user devices.

Aspect 52. The system of Aspect 51, wherein the peripheral devices are configured to receive sensing data from the user devices.

Aspect 53. The system of Aspect 51 or 52, wherein the peripheral devices each include a sensing device.

Aspect 54. An electronic meeting tool for mediating an audio source for a meeting on a communications and collaboration platform, the tool comprising:

- one or more peripheral devices adapted to couple one or more user devices to the communications and collaboration platform,
- wherein the peripheral devices are further configured to:
  - receive sensing data from an audio device;
  - manipulate the sensing data; and
  - sending the sensing data to a base unit to determine the audio source.

Aspect 55. The system of Aspect 54, wherein the peripheral devices are configured to receive the sensing data from the user devices.

Aspect 56. The system of Aspect 54 or 55, wherein the peripheral devices are configured to present, via a virtual audio device, mediated audio signals to the communications and collaboration platform.

What is claimed is:

1. A system for mediating an audio source for a meeting on a communications and collaboration platform, the system comprising:

an audio source detection module configured to identify at least one active audio source;

an instance detection module configured to map the at least one active audio source to one or more instances connected to the communications and collaboration platform to determine a mapped instance; and an audio control module configured to:

determine at least one audio signal device from a plurality of devices to capture audio from the active audio source; and configure an audio system to manipulate an active audio signal from the audio signal device via the mapped instance, wherein the audio source detection module is configured to receive at least one of audio data, video data, or metadata from the plurality of devices and to determine whether the active audio source is associated with the active audio device, and wherein when the active audio source is associated with the active audio device, the instance detection module is further configured to designate one of the instances associated the active audio device as the mapped instance, and when the active audio source is not associated with the active audio device, the instance detection module is further configured to designate one of the instances associated with one of the devices as the mapped instance.

2. The system of claim 1, wherein the audio source detection module is configured to determine, based on the received audio data, video data, or metadata, an active audio device from the plurality of devices for the active audio source.

3. The system of claim 1, wherein the audio source detection module comprises a detection aggregator to aggregate the received audio data, video data, or metadata into a consensus to determine the active audio source.

4. The system of claim 3, wherein the detection aggregator is a centralized detection aggregator hosted by a base unit of the plurality of devices.

5. The system of claim 1, further comprising a device federation module configured to detect a presence of one of the plurality of devices, and automatically connect the device to the communications and collaboration platform.

6. The system of claim 1, wherein the audio signal device comprises one or more room audio peripherals.

7. The system of claim 1, wherein the audio signal device comprises an audio device of a portable computing device.

8. A method for mediating an audio source for a meeting on a communications and collaboration platform, the method comprising:

identifying at least one active audio source, wherein identifying the active audio source further comprises receiving at least one of audio data, video data, or metadata from a plurality of devices;

mapping the active audio source to one or more instances connected to the communications and collaboration platform to determine a mapped instance;

determining at least one audio signal device from the plurality of devices for the active audio source;

configuring an audio system to manipulate an active audio signal from the audio signal device via the mapped instance;

further comprising determining, based on the received audio data, video data, or metadata, an active audio device from the plurality of devices for the active audio source, wherein mapping the active audio source further comprises determining whether the active audio source is associated with the active audio device, when the active audio source is associated with the active audio device, designating one of the instances associated with the active audio device as the mapped instance, and when the active audio source is not associated with the active audio device, designating one of the instances associated with one of the devices as the mapped instance.

9. The method of claim 8, further comprising aggregating, via a centralized detection aggregator, the received audio data, video data, or metadata into a consensus to determine the active audio device.

10. The method of claim 8, further comprising upon identifying a second active audio source, determining a second mapped instance, and maintaining a routing of the active audio signal from the audio signal device.

11. The method of claim 8, further comprising detecting a presence of one of the plurality of devices, and automatically connecting the device to the communications and collaboration platform.

12. The method of claim 8, wherein the audio signal device comprises one or more room audio peripherals.

13. The method of claim 8, further comprising configuring the audio system to manipulate the active audio signal to adapt to the active audio source.

14. The method of claim 8, further comprising identifying a second active audio source, and mapping the second active audio source to at least one of the instances to determine a second mapped instance.

15. An electronic meeting tool for mediating an audio source for a meeting on a communications and collaboration platform, the tool comprising:

one or more peripheral devices adapted to couple one or more user devices to the communications and collaboration platform, wherein the peripheral devices are further configured to:

receive sensing data from an audio device;

manipulate the sensing data; and sending the sensing data to a base unit to determine the audio source, wherein the peripheral devices are configured to receive the sensing data from the user devices, and wherein the peripheral devices are configured to present, via a virtual audio device, mediated audio signals to the communications and collaboration platform.

* * * * *